(12) United States Patent
Utsunomiya

(10) Patent No.: US 8,684,536 B2
(45) Date of Patent: *Apr. 1, 2014

(54) APPARATUS FOR COOLING HEAT GENERATING SPOT OF ELECTRONIC DEVICE, COOLING METHOD THEREFORE, AND LIQUID CRYSTAL PROJECTOR APPARATUS

(75) Inventor: Motoyasu Utsunomiya, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/427,752

(22) Filed: Mar. 22, 2012

(65) Prior Publication Data

US 2012/0176578 A1    Jul. 12, 2012

Related U.S. Application Data

(63) Continuation of application No. 12/311,528, filed as application No. PCT/JP2007/070297 on Oct. 11, 2007.

(30) Foreign Application Priority Data

Oct. 23, 2006    (JP) .................................. 2006-287395

(51) Int. Cl.
   *G03B 21/18*    (2006.01)
(52) U.S. Cl.
   USPC ........................................................... 353/61
(58) Field of Classification Search
   USPC ...................... 353/57–61; 361/695; 349/161
   See application file for complete search history.

(56) References Cited

U.S. PATENT DOCUMENTS

| | | | | |
|---|---|---|---|---|
| 6,108,203 | A | * | 8/2000 | Dittus et al. ................... 361/695 |
| 6,334,686 | B1 | * | 1/2002 | Shiraishi et al. ................. 353/57 |

(Continued)

FOREIGN PATENT DOCUMENTS

| | | |
|---|---|---|
| EP | 0 686 991 A1 | 12/1995 |
| JP | 5-267874 A | 10/1993 |

(Continued)

OTHER PUBLICATIONS

Japanese Office Action dated Oct. 15, 2010, with English translation.

(Continued)

*Primary Examiner* — Thanh Luu
*Assistant Examiner* — Danell L Owens
(74) *Attorney, Agent, or Firm* — McGinn IP Law Group, PLLC

(57) ABSTRACT

A cooling apparatus for a liquid crystal image display having a liquid crystal unit includes an incident-side polarizing plate, a liquid crystal panel and an exit-side polarizing plate. The incident-side polarizing plate, the liquid crystal panel and the exit-side polarizing plate are disposed side by side with a gap therebetween to have the same in-plane direction. A first cooling unit feeds an air stream in an orientation of the in-plane direction, and a second air cooling unit feeds an air stream in the in-plane direction in a different orientation from the air stream by the first air cooling unit. The first air cooling unit and the second air cooling unit are set such that the first and second air stream collide with each other between the incident-side polarizing plate and the liquid crystal panel and/or between the liquid crystal panel and the exit-side polarizing plate.

14 Claims, 19 Drawing Sheets

(56) References Cited

U.S. PATENT DOCUMENTS

| | | |
|---|---|---|
| 6,388,879 B1 | 5/2002 | Otaguro et al. |
| 6,481,854 B1 * | 11/2002 | Sugawara et al. ............... 353/52 |
| 6,572,231 B1 | 6/2003 | Watanabe |
| 6,796,660 B2 | 9/2004 | Shiraishi et al. |
| 6,808,296 B2 | 10/2004 | Chou et al. |
| 2005/0036116 A1 | 2/2005 | Yajima et al. |
| 2006/0050242 A1 * | 3/2006 | Arboix ........................... 353/57 |
| 2006/0152684 A1 * | 7/2006 | Lin et al. ........................ 353/58 |
| 2007/0019168 A1 * | 1/2007 | Nakagawa et al. ............. 353/58 |

FOREIGN PATENT DOCUMENTS

| | | |
|---|---|---|
| JP | 5-299165 | 11/1993 |
| JP | 7-103509 | 4/1995 |
| JP | 7-307962 A | 11/1995 |
| JP | 11-295814 | 10/1999 |
| JP | 2000-124649 | 4/2000 |
| JP | 2000-231154 A | 8/2000 |
| JP | 2001-209126 | 8/2001 |
| JP | 2001-318361 | 11/2001 |
| JP | 2002-116503 | 4/2002 |
| JP | 2003-109080 | 4/2003 |
| JP | 2003-241316 A | 8/2003 |
| JP | 2004-12038 | 1/2004 |
| JP | 2004-61894 | 2/2004 |
| JP | 2004-77113 | 3/2004 |
| JP | 2004-148965 | 5/2004 |
| JP | 2004-340990 | 12/2004 |

OTHER PUBLICATIONS

Japanese Office Action dated Jan. 14, 2011, with partial English translation.

* cited by examiner

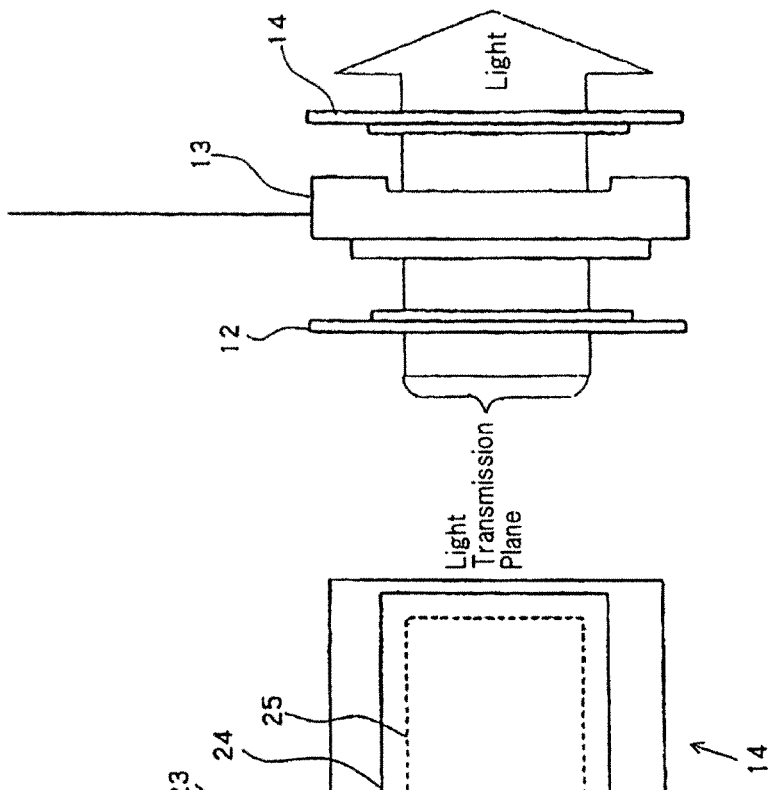
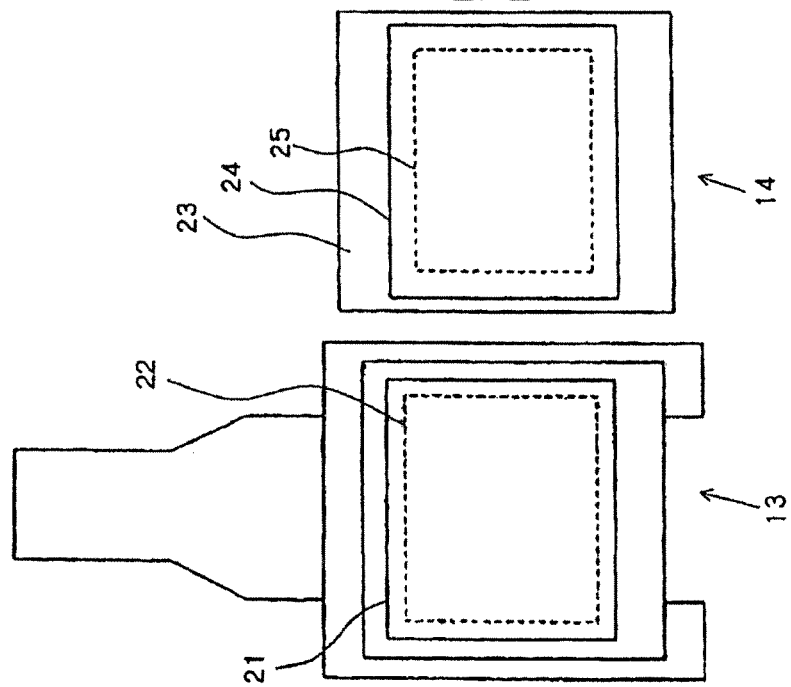

APPARATUS FOR COOLING HEAT GENERATING SPOT OF ELECTRONIC DEVICE, COOLING METHOD THEREFORE, AND LIQUID CRYSTAL PROJECTOR APPARATUS

The application is a continuation of co-pending application U.S. patent application Ser. No. 12/311,528, filed on Apr. 2, 2009, which is a National Stage of International Application No. PCT/JP2007/070297, filed on Oct. 11, 2007, which is based on Japanese patent application No. 2006-287395, filed on Oct. 23, 2006, the entire contents of which is incorporated herein by reference.

TECHNICAL FIELD

The present invention relates to an apparatus for cooling a heat generating spot (area) of an electronic device, a cooling method therefor, and a liquid crystal projector apparatus, and more particularly, to an apparatus for cooling a heat generating spot (area) of an electronic device, with two cooling units which feed air streams that collide with each other on a cooling plane, a cooling method therefor, and a liquid-crystal projector apparatus which includes the apparatus for cooling a heat generating spot of an electronic device.

BACKGROUND ART

Apparatuses for cooling heat generating spots of electronic devices have been used in a variety of forms, and cooling apparatuses which rely on air for cooling have been developed in a variety of configurations for purposes of simplifying the configuration. A plurality of forced air cooling type cooling apparatuses are provided in projector apparatuses which are projection display devices currently widely used for business and home applications.

A projection display device projects an image generated on an image display element of an image display onto a screen under magnification. Among such projection display devices, a liquid crystal projector apparatus which employs liquid crystal panels for image display elements displays an image on a screen in the following configuration and operation.

White light from a light source is reflected by a reflector, and is polarized or converted by PBS (Polarization-Beam Splitter) for separation into respective color light of red, green, and blue (R/G/B). Each separated color light is directed into each liquid crystal panel corresponding thereto, and optically modulated by the liquid crystal panel in accordance with a video signal. Each optically modulated color light is combined by a cross dichroic prism and projected onto a screen through a projection optical system.

In this event, a liquid crystal panel which operates in a TN (Twisted Nematic) mode can treat only a particular linearly polarized component, so that each color light is coordinated in a predetermined polarization direction (for example, S-polarization) by a polarizing plate before it impinges on the liquid crystal panel, and then optically modulated by the liquid crystal panel. Subsequently, an S-polarized component is cut by a polarizing plate on the exit side of the liquid crystal panel to extract a P-polarized component alone.

In this way, within a liquid crystal unit which includes an incident-side polarizing plate, a liquid crystal panel, and an exit-side polarizing plate, the incident-side polarizing plate and exit-side polarizing plate disposed before (upstream) and after (downstream) the liquid crystal panel along the optical axis each have functions of passing only polarized light in one axial direction and blocking other polarized light, and therefore generate heat during their operations due to light absorption. Also, the liquid crystal panel internally generates heat during its operations in the same manner because part of the transmitted light is blocked by a black matrix disposed on boundaries of respective pixels.

Organic materials are often used for these liquid crystal panels and polarizing plates, so that if they are irradiated with light at short wavelengths or are exposed to high temperatures for long time, their functions will be largely compromised by damaged alignment films of the liquid crystal panels, lower polarization selection characteristics of the polarizing plates, and the like. Accordingly, countermeasures to heat radiation, such as forced air cooling, are required for these components of the liquid crystal unit.

A specially configured cooling apparatus is required for efficiently cooling a plurality of heat generating spots of a plurality of components in an electronic device, each of which has surfaces that oppose each other with a spacing defined therebetween, and includes heat generating spots on the surfaces opposite to each other.

FIGS. 1(a) and 1(b) are schematic diagrams of the configuration of a liquid crystal projector apparatus of a background related art, where FIG. 1(a) generally illustrates the appearance of the general liquid crystal projector apparatus, and FIG. 1(b) illustrates the internal structure of the liquid crystal projector apparatus. FIG. 2 in turn is a schematic diagram of the internal configuration of the liquid crystal projector apparatus.

As mainly illustrated in FIG. 2, liquid crystal projector apparatus 1 includes cooling fan 3 for forcedly cooling liquid crystal unit 2, and cooling air duct 4, both of which are mounted in the housing of liquid crystal projector apparatus 1. In addition, lamp cooling fan 7 for cooling light source 5, power supply unit 10 and the like, exhaust fan 9 for exhausting the housing, and the like are provided as required.

Here, a general method of cooling liquid crystal unit 2 of liquid crystal projector apparatus 1 will be described with reference to FIGS. 3A and 3B. FIGS. 3A and 3B are schematic diagrams illustrating the configuration of a cooling unit for cooling the liquid crystal unit in the liquid crystal projector apparatus, where FIG. 3A is an exploded perspective view, and FIG. 3B is a schematic cross-sectional view for describing a forced air cooling operation.

In FIG. 3B, liquid crystal unit 2 including incident-side polarizing plate 12, liquid crystal panel 13, and exit-side polarizing plate 14 is provided for each color light (R/G/B), and air cooling device 15 including cooling fan 3 and cooling air duct 4 is disposed therebelow.

During the operation of air cooling device 15, air 16 from cooling fan 3 is fed into spaces among incident-side polarizing plate 12, liquid crystal panel 13, exit-side polarizing plate 14, which include each liquid crystal unit 2, from the lower end of liquid crystal unit 2 through discharge port 17 provided in cooling air duct 14 to perform forced air cooling.

In recent years, a reduction in size and an increase in luminance have been increasingly requested for liquid crystal projector apparatuses in accordance with their versatile usages. To respond to such requests, an increase in lamp power and a reduction in size of display device are now under progress, resulting in an increase in flux density of light incident on the liquid crystal unit, and a continuous increase in heat load on each component which forms part of liquid crystal unit 2.

For example, in a liquid crystal projector apparatus (1.0"-XGA) of 2000-lm class, a total amount of heat generated by liquid crystal units is approximately 15 W, while heat flux of an exit-side polarizing plate is approximately 0.6 W/cm$^2$.

However, with a 5000-lm class, a total amount of heat generated by liquid crystal units amounts to 35 W or more, while heat flux of an exit-side polarizing plate amounts to 1.4 W/cm$^2$ or more.

Generally, when forced air cooling is used for cooling liquid crystal units, the amount of air fed by a fan is increased to enhance the air velocity around a heat generating spot to improve the heat transfer coefficient and heat radiation capabilities, thereby accommodating ever increasing heat loads.

However, as the amount of fed air is increased by increasing the rotational speed of the fan, operation noise will increase. On the other hand, as the amount of fed air is increased by employing a fan of larger size, this mitigates reducing the size of the apparatus.

On the other hand, requests have been gradually increased for longer lifetime of liquid crystal projector apparatus for reducing environmental loads and running cost. Apart from lamps, a factor which dominates the lifetime of the liquid crystal projector apparatus is mainly the lifetime due to degraded optical characteristics in the liquid crystal units. Accordingly, the lifetime can be increased by reducing the operating temperature of the liquid crystal units through improvements on the cooling performance.

However, in a laminar flow region, the average heat transfer coefficient of forced convection is proportional to the square root of the air velocity, while the operating temperature of the panel is reciprocally proportional to the square root of the air velocity. Thus, a reduction in the operating temperature of the panel to some extent will result in a lower sensitivity of a change in panel temperature to a change in air velocity.

FIG. 4 is a graph showing the relationship between a panel cooling air velocity and the panel operating temperature in 0.8"-SXGA (5000-lm class, 25° C. environment). For reducing the panel operating temperature from 70° C. to 60° C. ($\Delta T=-10°$ C.), the air velocity may be simply increased from 4.5 m/s to 8 m/s ($\Delta V=+3.5$ as for reducing 60° C. to 50° C. ($\Delta T=-10°$ C.), the air velocity must be increased from 8 m/s to 18 m/s ($\Delta V=+10$ m/s), as can be seen from the graph.

In this way, when forced air cooling is relied on to further reduce the panel operating temperature for prolonging the lifetime, the cooling air velocity is excessively required as the target temperature is lower. Accordingly, the fan operation noise can further increase, or the apparatus can be increased in size, as described above, and in some cases, the limit of cooling capabilities (air cooling limit) can be exceeded, so that the development of a highly efficient liquid crystal unit cooling system is an urgent necessity.

Further, in regard to the liquid crystal panel, another requirement exists for cooling from a viewpoint of image quality. Specifically, since the optical modulation effect to an input signal highly depends on the temperature in the optical modulation of the liquid crystal panel, thermal gradient on the panel plane cause variations in luminance and color, resulting in a degraded quality of projected images. For this reason, in cooling the liquid crystal panel, a cooling method is desired to minimize a temperature gradient and temperature variations which occur on the surface of the panel in operation.

FIG. 5 is a schematic side view illustrating a first related art example of liquid crystal unit cooling, as disclosed in Patent Document 1 (JP-11-295814A). Specifically, an apparatus for improving a liquid crystal panel cooling efficiency is provided with the aid of air directing plate 39 disposed below cross dichroic prism 35 to optimize the direction of air fed from cooling fan 3.

FIG. 6 is a schematic perspective view illustrating a second related art example of liquid crystal unit cooling, as disclosed in Patent Document2 (JP-2001-318361A). Specifically, an apparatus for improving a cooling efficiency is provided with protrusion 41 for guiding cooling air to liquid crystal holding a 40 to restrain interstices of air fed from duct discharge port 42.

FIG. 7 is a schematic cross-sectional view illustrating a third related art example of liquid crystal unit cooling, as disclosed in Patent Document 3 (JP-2004-61894A). Specifically, an apparatus is provided for adjusting a cooling air velocity by changing air passage widths (X and Y in the figure) between liquid crystal panel 13 and polarizing plate 14 with the provision of cutout 43 in an air passage of liquid crystal panel holding frame 40.

FIGS. 8A and 8B are schematic diagrams illustrating a first example of a fourth related art example of liquid crystal unit cooling, where FIG. 8A is a top plan view, and FIG. 8B is a lateral sectional view. FIGS. 9A and 9B are schematic diagrams illustrating a second example of the fourth related art example of liquid crystal unit cooling, where FIG. 9A is a top plan view, and FIG. 9B is a lateral sectional view. This fourth related art example is disclosed in Patent Document 4 (JP-2000-124649A).

In FIGS. 8A and 8B, air leading plate 44 having a U-shaped groove form is connected (positioned) between liquid crystal panel 13 and polarizing plate 12, for turning the direction of cooling air blown up from below on the exit side of liquid crystal panel 13 by the U-shaped groove at the upper end by 180° to feed the air from above to below on incident polarizing plate 12, thereby eliminating thermal gradient which occur on the panel surface.

On the other hand, in FIGS. 9A and 9B, an apparatus is disclosed for eliminating thermal gradient on a panel plane with the provision of a pair of cooling fans 3a, 3b above and below liquid crystal panel 13, with the liquid crystal panel interposed therebetween, to feed an air stream from below to above on the exit side and from above to below on the incident side.

FIG. 10 is a schematic lateral sectional view illustrating a fifth related art example of liquid crystal unit cooling. This fifth related art example is disclosed in Patent Document 5 (JP-2001-209126A) which discloses an apparatus which includes a liquid crystal panel cooling unit in a closed internal circulation structure with the use of circulation duct 45, where first cooling fan 3a air-cools a liquid crystal unit, exhaust air heated by received heat is transferred to external air circulation duct 46 shield by circulation duct 45 through a heat sink or the like (not shown, provided on the boundary of circulation duct 45 and air circulation duct 46 in the figure), and the heat of the heat sink is radiated by second cooling fan 3b which is provided outside.

DISCLOSURE OF THE INVENTION

Problems to be Solved by the Invention

As described above, when an attempt is made to increase the air velocity of the fan to improve the cooling performance in the cooling of the liquid crystal unit, this will lead to increased fan operation noise and mounting volume. Further, when the liquid crystal unit is desirably cooled to about room temperature to prolong its lifetime, this can be hampered by the air cooling limit (the temperature is not reduced even if the air velocity is increased).

Patent Document 1 (first related art example) discloses a structure which includes an air directing plate below a cross dichroic prism for adjusting the direction of cooling air fed to a liquid crystal panel to improve the efficiency of cooling the liquid crystal panel. However, even if an increased amount of air is fed to impinge the panel exit side by optimizing the angle at which the air is fed to the liquid crystal panel, a reduced air stream is fed to the exit-side polarizing plate positioned on the opposite surface thereof on the contrary, thereby resulting in a lower efficiency of cooling the exit-side polarizing plate.

Patent Document 2 (second related art example) discloses an apparatus which includes a protrusion in a liquid crystal panel holding frame for limiting interstices of fed air stream to efficiently guiding the air stream fed through the duct to the liquid crystal panel without waste. However, since the restraint of leaking air by the protrusion partially causes a reduction in air velocity due to an increased air resistance, and a rise in panel temperature due to stagnation of discharge heat (exacerbation of release of exhaust air) in a downstream region (above the liquid crystal panel), the improvement on the cooling efficiency is canceled out, thus making it difficult to provide sufficient effects.

Patent Document 3 (third related art example) discloses an apparatus which includes a cutout in an air path of a liquid crystal panel holding frame to ensure an air passing area even if a spacing with a polarizing plate is narrow, thereby compensating for the cooling air velocity. However, when the spacing between respective units is narrow at an inflow end, this constitutes an air resistance to reduce the amount of fed air. Also, even if a cutout is provided on the downstream side thereof to increase the air passing area, the air velocity is reduced at cooled components (liquid crystal panels, and light transmission planes of polarizing plates), so that the cooling efficiency is not increased.

The first example of Patent Document 4 (fourth related art example) discloses a structure which includes an air guiding plate having a U-shaped groove form connected (positioned) between a liquid crystal panel and a polarizing plate to turn around an air stream fed by a fan at a top end to cool the liquid crystal panel in opposite directions on the incident side and exit side of the liquid crystal panel, thereby alleviating variations in panel temperatures. In this event, however, the air passing area is reduced to one half, and an air traveling distance is increased twice, as compared with conventional structures, thus exacerbating the air resistance to restrain the amount of air fed by the fan. Also, since the air which has passed by and cooled the panel exit side in the former half of the U-shaped groove is heated by discharged heat, the heat radiation capabilities significantly decrease in the latter half in which the air turns around to pass by the panel incident side. Thus, this structure is not suitable for highly efficient cooling.

On the other hand, in the second example (FIGS. 9A and 9B) of the fourth related art example which ventilates the panel incident side and exit side individually in opposite directions using a pair of fans, this is effective in that the heat generation distributions (cooling actions) on the panel surfaces are upside down on the incident side and exit side to balance the temperature within the panel. However, this structure follows a conventional cooling method in that a parallel air flow is directed onto a heat generating plane to radiate heat, and fails to achieve a sufficient cooling efficiency because an air resistance increases due to a reduction of each air passing area to one half while a heat radiation load per fan is reduced.

Patent Document 5 (fifth related art example) forcedly air-cools liquid crystal units by a closed circulation system to transfer heat of exhaust air to the outside through a heat sink and radiate the heat by another air-cooling fan, thereby reducing the temperature of internally circulated air for cooling the liquid crystal units. In this event, however, while effective for preventing dusts being introduced into the liquid crystal units, the transport of discharged heat involves a heat transfer process of gas (internally circulated flow)→solid (heat sink) →air (forced air cooling to external air) twice, and therefore the fifth related art example disadvantageously suffers from a poor heat transport efficiency due to a large heat resistance from the internally circulated air to the external air and cannot be applied to a high luminance model which generates a large amount of heat.

It is an exemplary feature of the present invention to provide a silent cooling apparatus for effectively reducing the operating temperature of an electronic device which includes a plurality of components which include surfaces opposite to each other with a spacing therebetween and have a heat generating spot on at least any of the surfaces opposite to each other, in a small and low-cost configuration.

Means for Solving the Problem

An apparatus for cooling a heat generating spot of an electronic device of the present invention is a cooling apparatus for forcedly air-cooling a heat generating spot of an electronic device which includes a plurality of components which are disposed side-by-side to have the same in-plane direction, and which include heat generating spots within their surfaces. The cooling apparatus further includes first air cooling means for feeding an air stream to the heat generating spot in an orientation of the in-plane direction, and second air cooling means for feeding an air stream to the heat generating spot in the in-plane direction in a different orientation from the air stream by the first air cooling means.

Effects of the Invention

In the apparatus for cooling a heat generating spot of an electronic device in the present invention, for example, when applied to a cooling mechanism for a liquid crystal image display, a pair of air cooling means disposed in opposition in the vertical direction across a liquid crystal unit interposed therebetween, are used to cause air streams to collide in an opposing state in a space between a liquid crystal panel and a polarizing plate, thereby generating an impinging jet flow perpendicular to each heat generating plane of the liquid crystal panel and polarizing plate. In this way, the heat transfer coefficient can be significantly improved to promote the heat transfer, as compared with the cooling of a liquid crystal unit according to the background related art which relies on a uniform flow along a parallel plane, thus advantageously providing small-size, low-cost, and low-noise highly efficient cooling.

BRIEF DESCRIPTION OF THE DRAWINGS

The foregoing and other exemplary purposes, aspects and advantages will be better understood from the following detailed description of an exemplary embodiment of the invention with reference to the drawings.

FIG. 1(a) illustrates the appearance of a general liquid crystal projector apparatus, and FIG. 1(b) illustrates the internal structure of the liquid crystal projector apparatus.

FIG. 20A illustrates a schematic diagram for describing a liquid crystal panel and a light transmission plane of a polarizing plate in a liquid crystal image display, and a front view which depicts a liquid crystal panel and a polarizing plate side by side.

FIG. 20B illustrates a schematic diagram for describing a liquid crystal panel and a light transmission plane of a polarizing plate in a liquid crystal image display, and a side view which displays a liquid crystal panel and a polarizing plate side by side.

BEST MODE FOR CARRYING OUT THE INVENTION

Next, an apparatus for cooling a heat generating spot of an electronic device according to an exemplary embodiment of the present invention will be described in terms of the configuration and operation with reference to the drawings. In this exemplary embodiment, for facilitating the understanding, the electronic device will be described as represented by a liquid crystal image display of a liquid crystal projector apparatus, and components such as an incident-side polarizing plate, a liquid crystal panel, and an exit-side polarizing plate which form a liquid crystal unit. However, the present invention is not limited to this exemplary embodiment, but may also be applied to a cooling apparatus or the like for an electronic device which includes a plurality of components, each of which includes surfaces opposite to each other with a spacing defined therebetween, where at least any of the surfaces opposite to each other is a heat generating spot, for example, heat generating spots disposed across a narrow gap, such as a rack unit which has a plurality of printed circuit boards mounted therein in parallel, IC chips mounted on a board of a small-size electronic device in a narrow space facing an inner wall of a housing, and the like.

Since the liquid crystal projector apparatus has been previously described in the section of Background Art, the description is omitted here.

Figure 1:
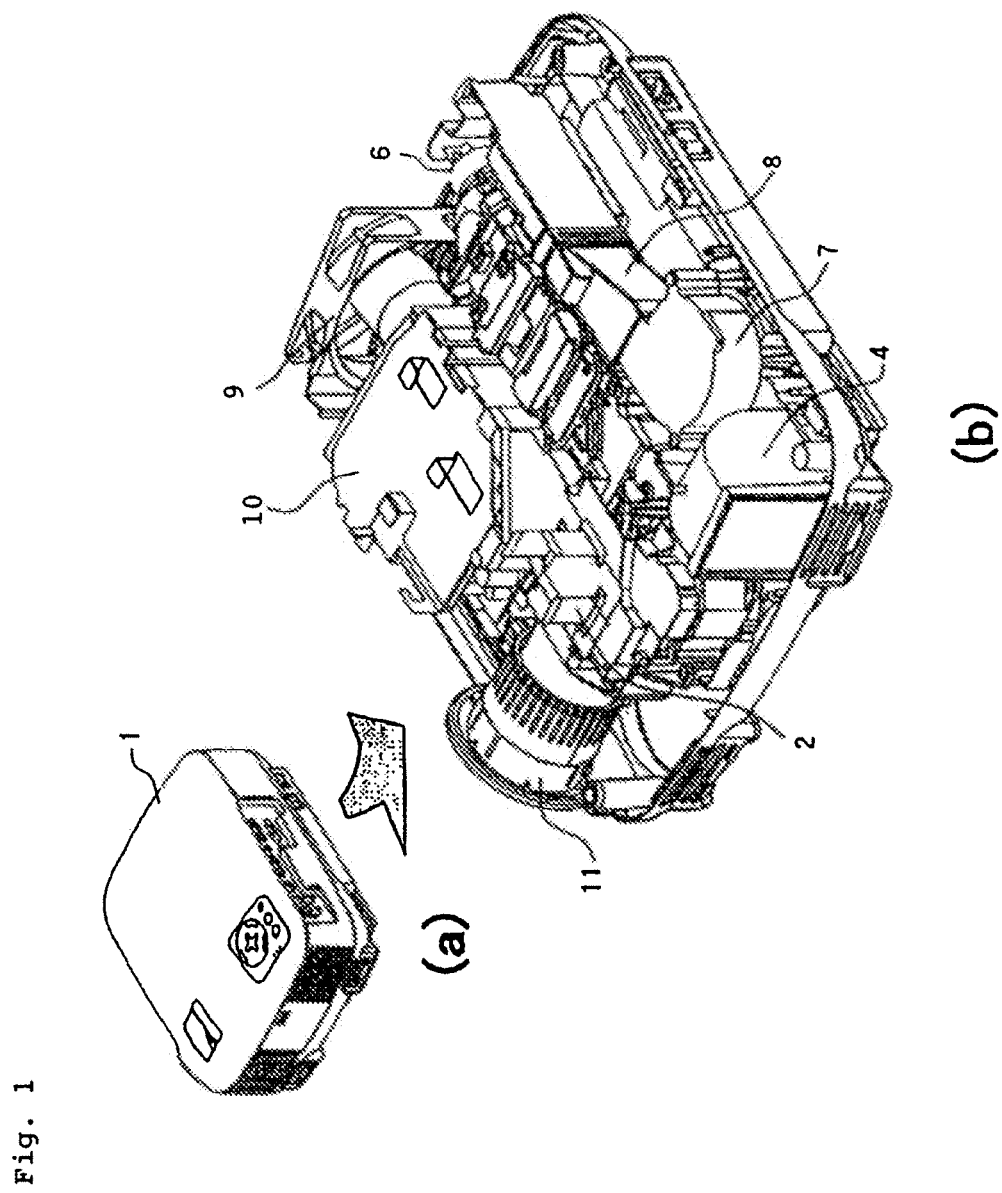
FIG. 1(a) and FIG. 1(b) are schematic diagrams of the configuration of a liquid crystal projector apparatus of a background related art, where
Figure 2:
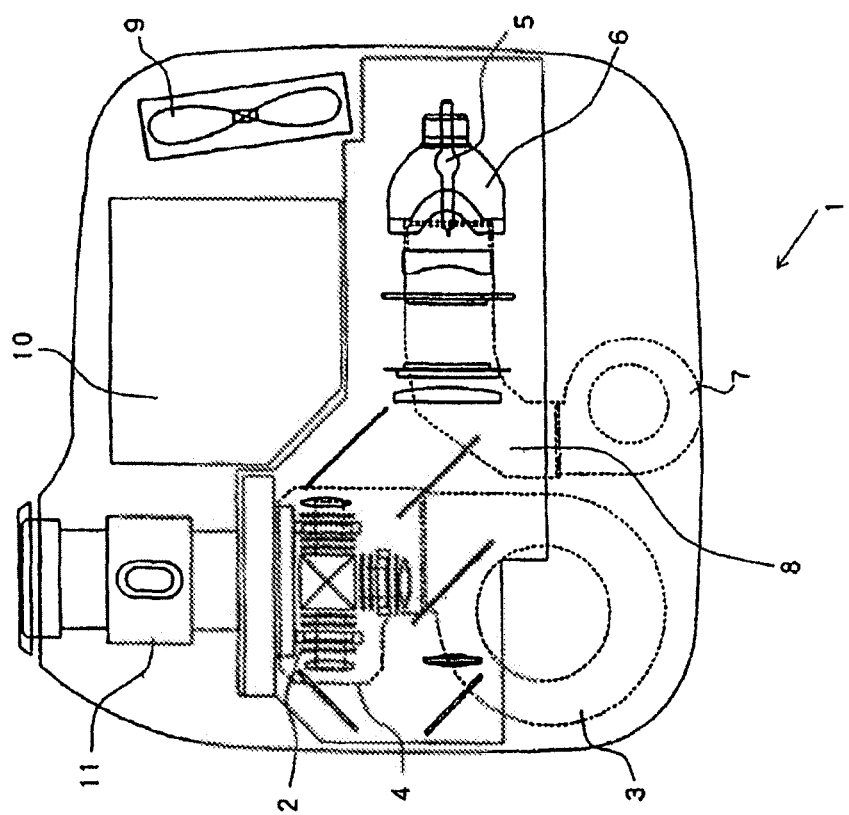
FIG. 2 illustrates a schematic diagram illustrating the internal configuration of a liquid crystal projector apparatus.
Figure 3A:
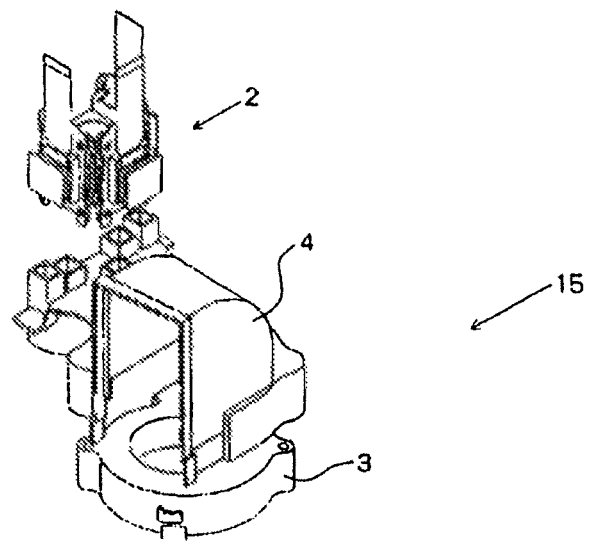
FIG. 3A illustrates a schematic exploded perspective view illustrating the configuration of a cooling unit for a liquid crystal unit of a liquid crystal projector apparatus.
Figure 3B:
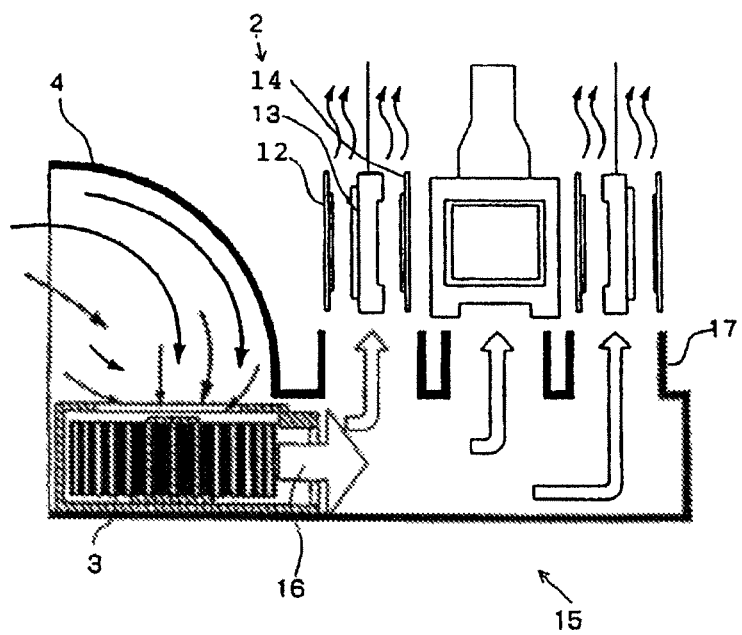
FIG. 3B illustrates a schematic cross-sectional view for describing a forced air cooling operation of the cooling unit for the liquid crystal unit of the liquid crystal projector apparatus.
Figure 4:
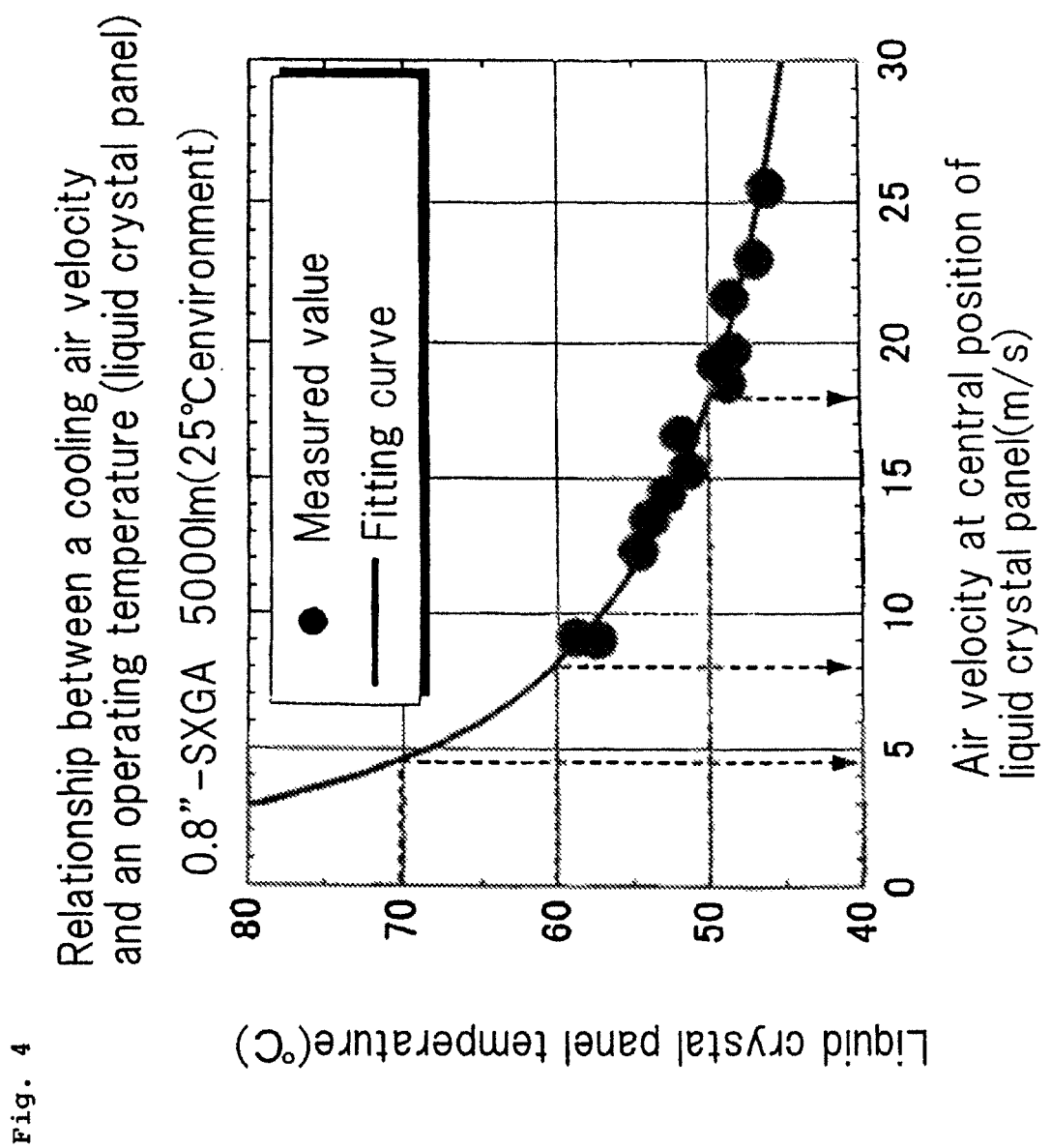
FIG. 4 illustrates a graph showing the relationship between a panel cooling air velocity and a panel operating temperature in 0.8"-SXGA (5000-lm class: 25° C. environment).
Figure 5:
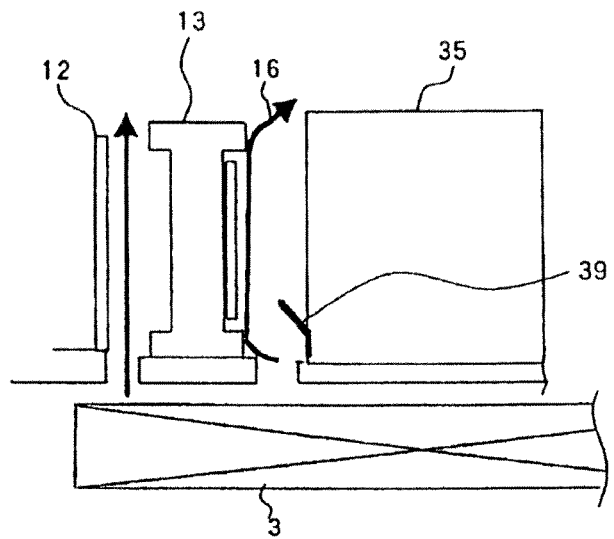
FIG. 5 illustrates a schematic side view illustrating a first related art example of cooling a liquid crystal unit.
Figure 6:
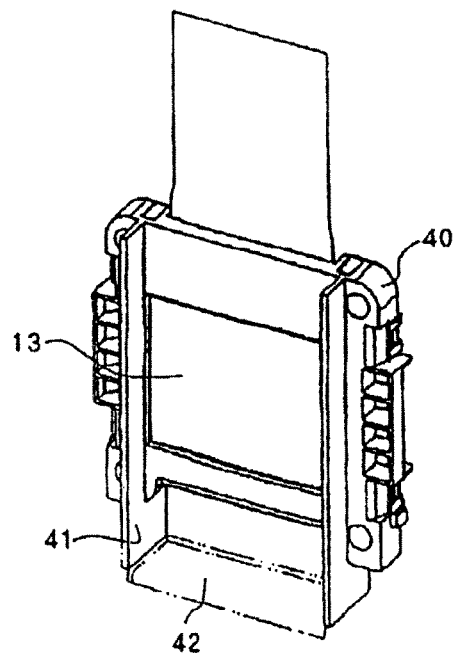
FIG. 6 illustrates a schematic perspective view illustrating a second related art example of cooling a liquid crystal unit.
Figure 7:
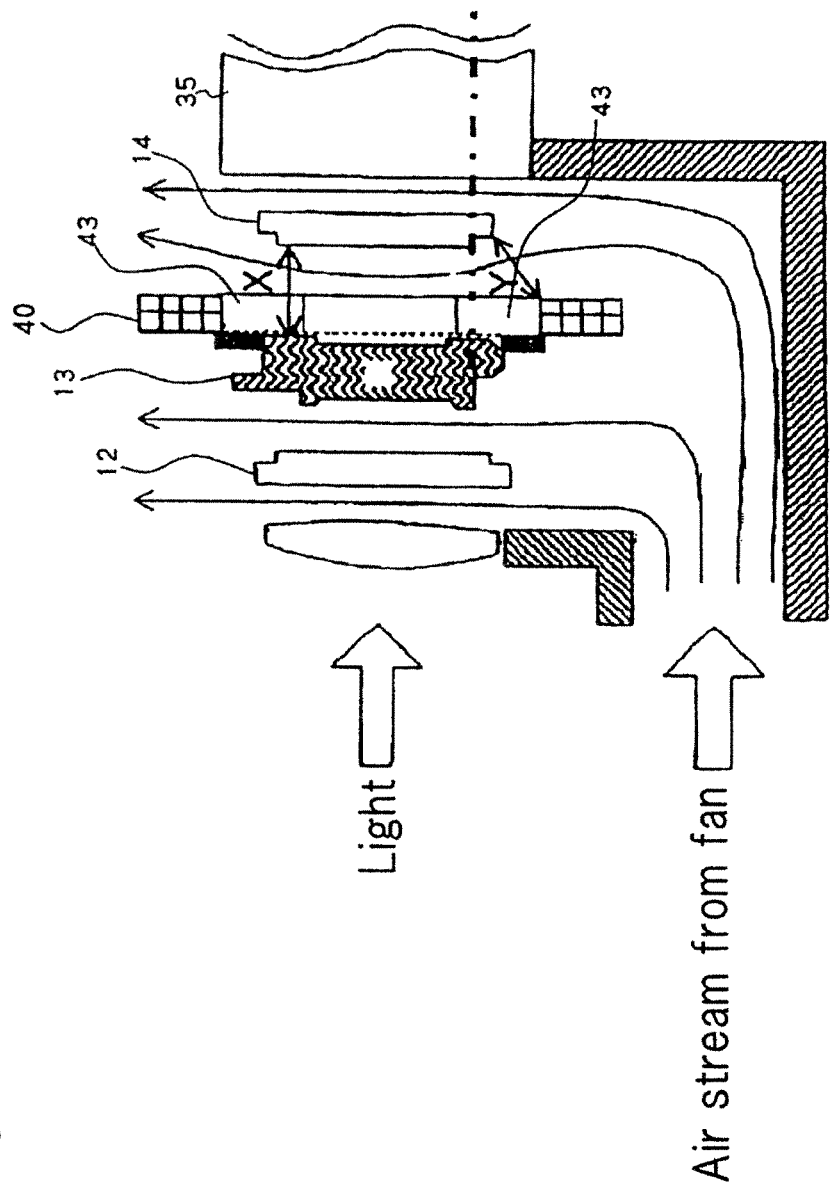
FIG. 7 illustrates a schematic side view illustrating a third related art example of cooling a liquid crystal unit.
Figure 8A:
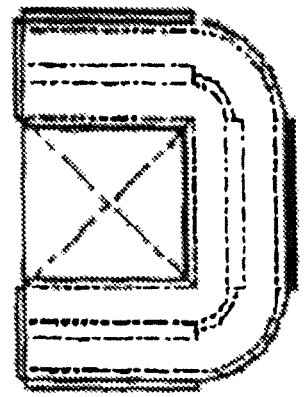
FIG. 8A illustrates a schematic top plan view illustrating a first example of a fourth related art example of cooling a liquid crystal unit.
Figure 8B:
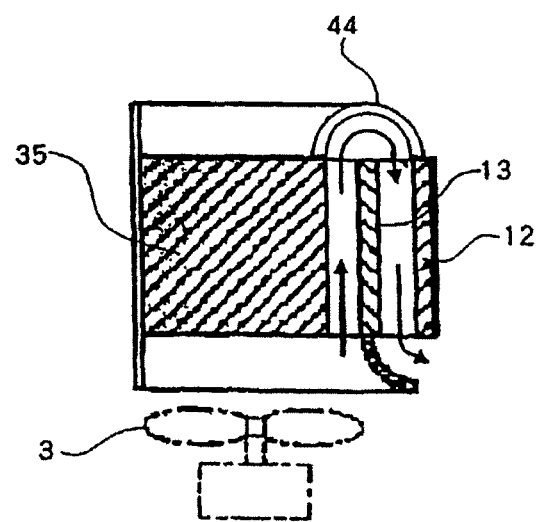
FIG. 8B illustrates a schematic lateral sectional view illustrating the first example of the fourth related art example of cooling a liquid crystal unit.
Figure 9A:
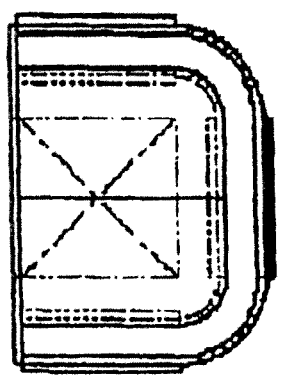
FIG. 9A illustrates a schematic top plan view illustrating a second example of the fourth related art example of cooling a liquid crystal unit.
Figure 9B:
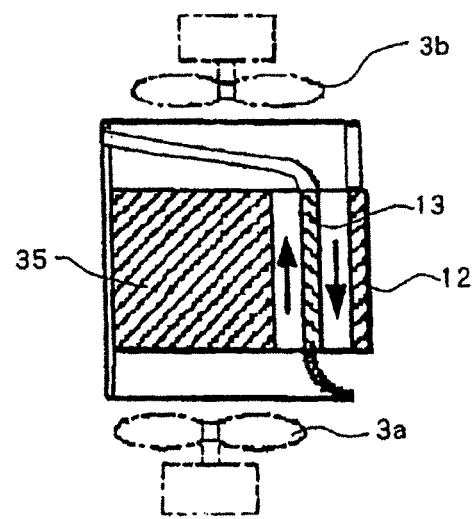
FIG. 9B illustrates a schematic lateral sectional view illustrating the second example of the fourth related art example of cooling a liquid crystal unit.
Figure 10:
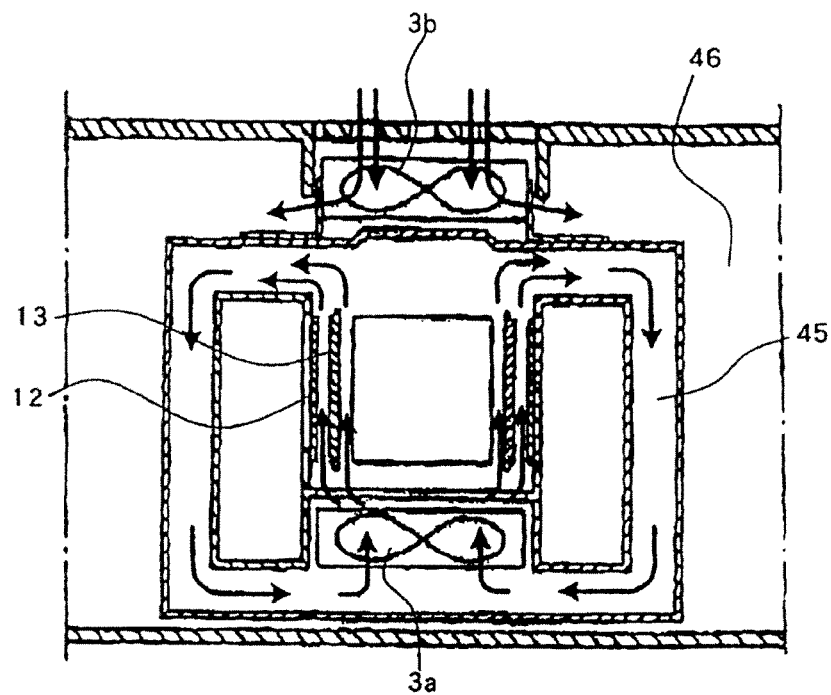
FIG. 10 illustrates a schematic lateral sectional view illustrating a fifth related art example of cooling a liquid crystal unit.
Figure 11:
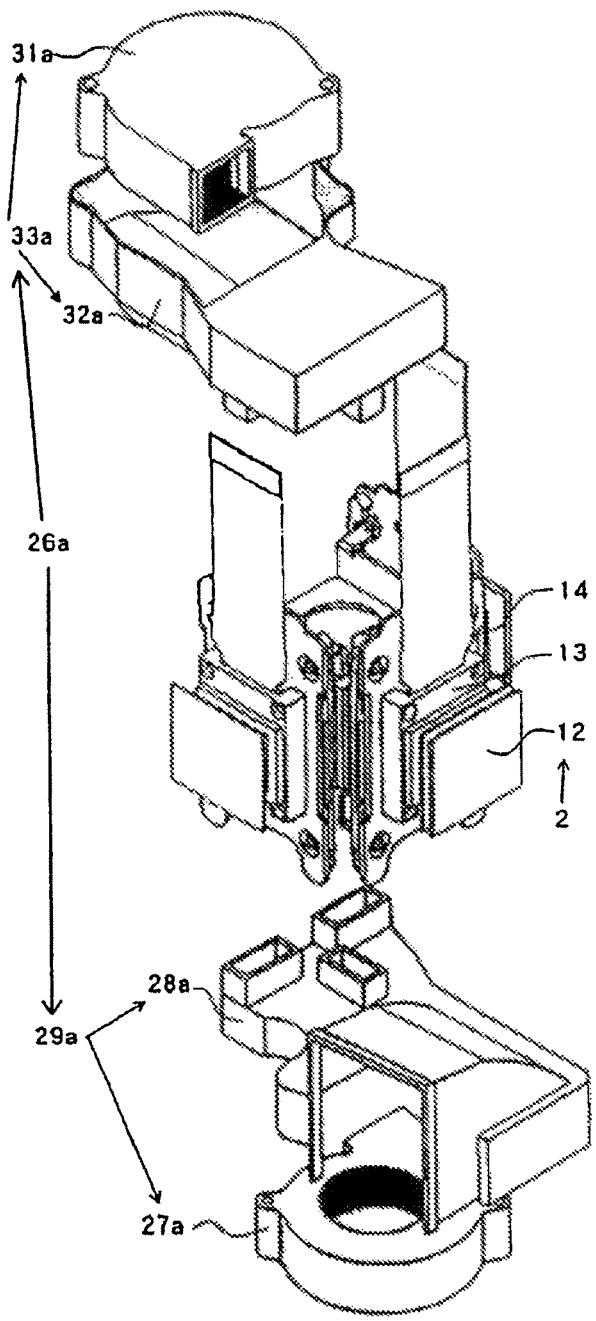
FIG. 11 illustrates a schematic exploded perspective view of an apparatus for cooling a heat generating spot of a liquid crystal image display according to a first exemplary embodiment of the present invention.
Figure 12:
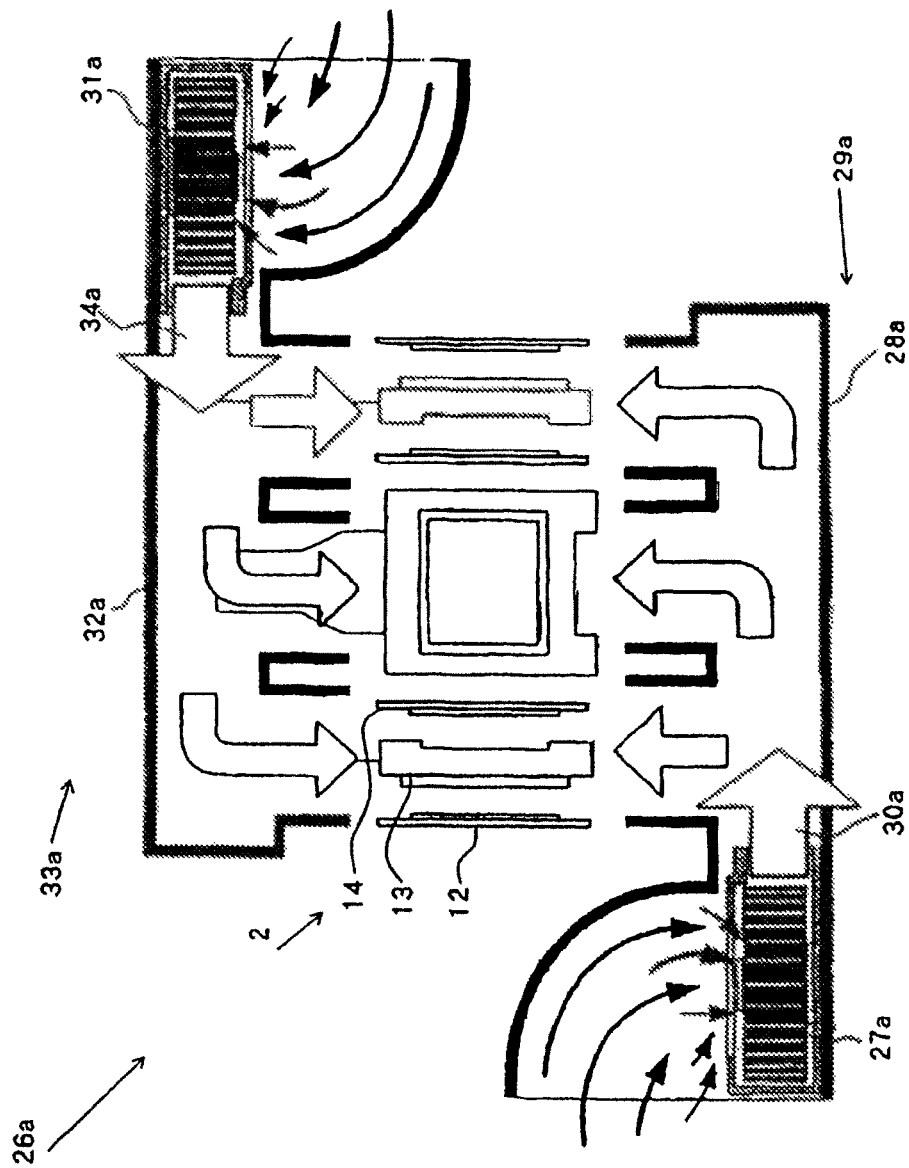
FIG. 12 illustrates a schematic cross-sectional view for describing the configuration and operation of the apparatus for cooling a heat generating spot in a liquid crystal image display according to the first exemplary embodiment of the present invention.
Figure 13:
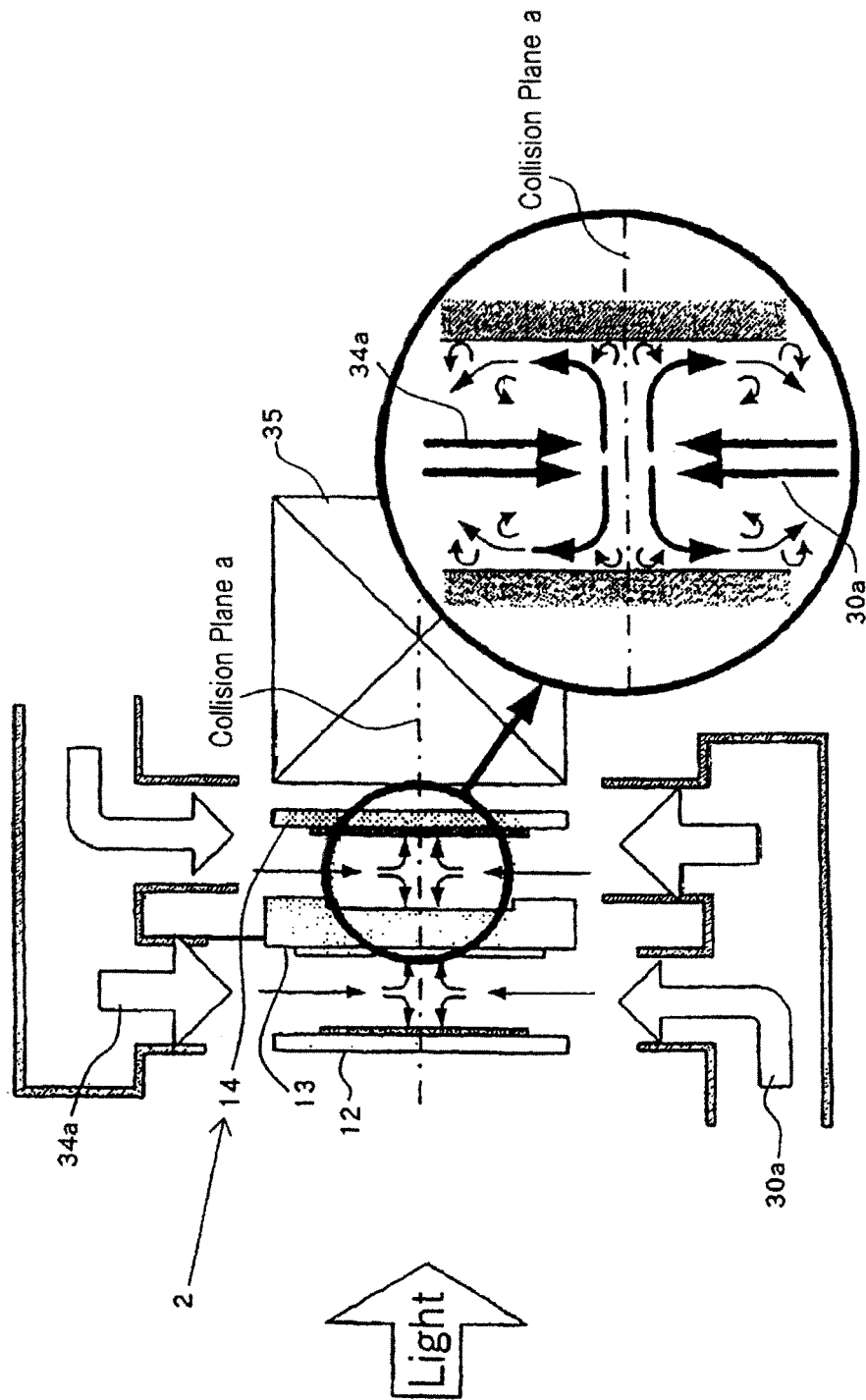
FIG. 13 illustrates a schematic partial cross-sectional view and a partially enlarged cross-sectional view showing the flow of an air stream for cooling a liquid crystal unit in FIG. 12

FIG. 11 is a schematic exploded perspective view of an apparatus for cooling a heat generating spot of a liquid crystal image display according to a first exemplary embodiment of the present invention, FIG. 12 is a schematic cross-sectional view for describing the configuration and operation of the heat generating spot cooling apparatus in the liquid crystal image display according to the first exemplary embodiment of the present invention, and FIG. 13 includes a schematic partial cross-sectional view and a partially enlarged cross-sectional view showing the flow of air for cooling a liquid crystal unit in FIG. 12.

Cooling apparatus 26a for a liquid crystal image display (electronic device) of a liquid crystal projector apparatus according to the present invention is formed of first air cooling unit 29a including first cooling fan 27a and first air cooling duct 28a, and like second air cooling unit 33a including second cooling fan 31a and second air cooling duct 32a, disposed at an upper and a lower end of liquid crystal unit 2 which is provided for each of R/G/B color light and includes incident-side polarizing plate 12, liquid crystal panel 13, and exit-side polarizing plate 14 which are assembled into a unit.

Referring next to FIG. 12, operations for cooling liquid crystal unit 2 by cooling apparatus 26a in this exemplary embodiment, will be described.

In this exemplary embodiment, as illustrated in FIG. 12, first air cooling unit 29a is provided at the lower end of liquid crystal unit 2, and first air stream 30a generated from first cooling fan 27a passes through spaces between incident-side polarizing plate 12 and liquid crystal panel 13 of each color light and between liquid crystal panel 13 and exit-side polarizing plate 14 from below to above through first air cooling duct 28a.

Additionally, second air cooling unit 33a is provided at the upper end of liquid crystal unit 2, and second air stream 34a generated from second cooling fan 31a passes through spaces between incident-side polarizing plate 12 and liquid crystal panel 13 of each color light and between Liquid crystal panel 13 and exit-side polarizing plate 13 from above to below through second air cooling duct 32a in the same manner.

Referring next to FIG. 13, a description will be given of a cooling action by cooling apparatus 26a in this exemplary embodiment. FIG. 13 is a schematic cross-sectional view of liquid crystal unit 2 for one color light alone, extracted from among liquid crystal units 2 in FIG. 12.

As described above, first air stream 30a is sent from the lower end of liquid crystal unit 2 into the space between incident-side polarizing plate 12 and liquid crystal panel 13 and the space between liquid crystal panel 13 and exit-side polarizing plate 14 from below to above. Second air stream 34a is sent from the upper end of liquid crystal unit 2 into the space between incident-side polarizing plate 12 and liquid crystal panel 13 and the space between liquid crystal panel 13 and exit-side polarizing plate 14 from above to below in the same manner. First and second air streams 30a and 34a collide at a central position (impinging plane a in the drawing) in an opposing state in a space between the respective units when first cooling fan 27a and second cooling fan 31a have an equivalent amount of fed air, and when first air cooling duct 28a and second air cooling duct 32a have an equal air resistance.

In this event, first air stream 30a and second air stream 34a which collide in an opposing state from directions opposite to each other, generate evolutional flows which perpendicularly go to polarizing plates 12, 14 on the incident/exit sides and the light transmission plane of liquid crystal panel 13 at positions at which they collide, as illustrated in a detailed view of FIG. 13. Thus, a perpendicular jet stream is formed toward a heat generating plane (light transmission plane) while allowing the transmission of the color light.

In this way, the heat transfer coefficient can be largely increased as compared with a cooling method of the background related art which relies on a parallel flat flow, thus making it possible to cool the liquid crystal units at a high heat radiation efficiency.

Figure 14:
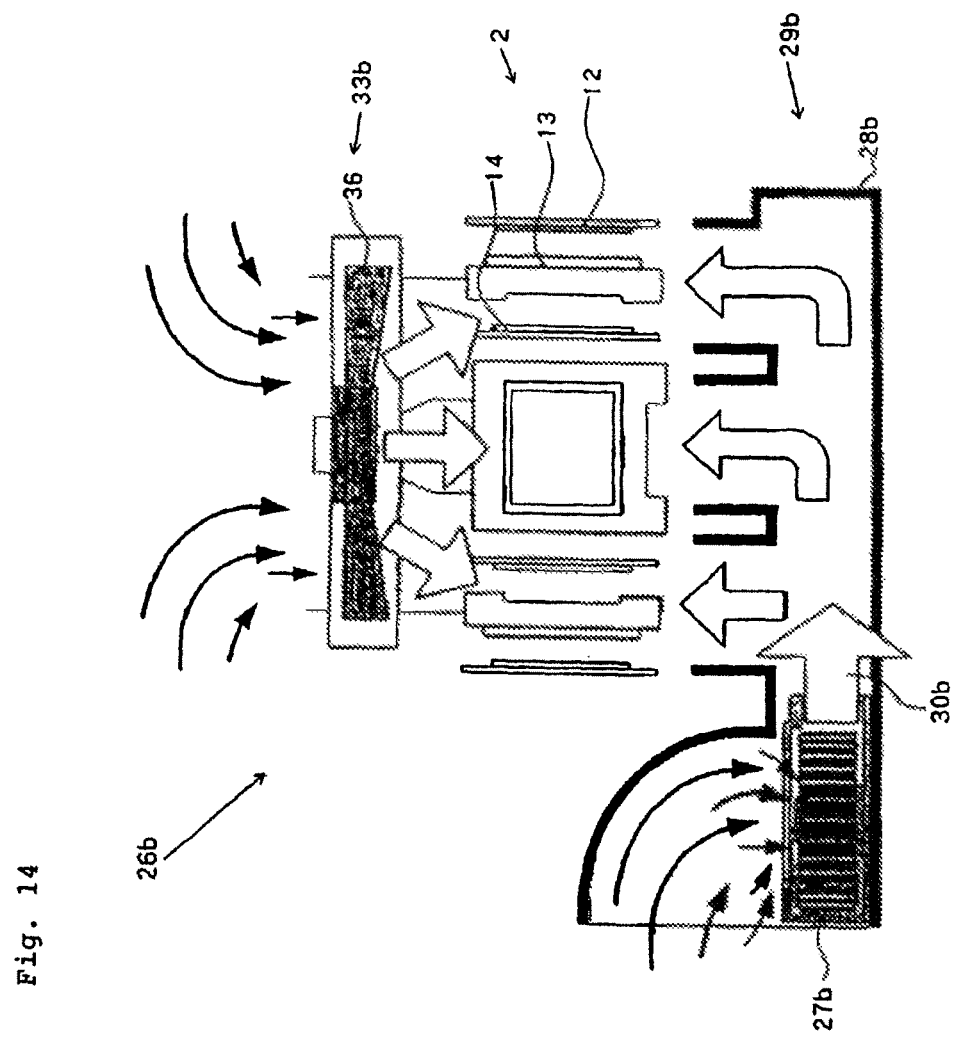
FIG. 14 illustrates a schematic cross-sectional view for describing the configuration and operation of apparatus for cooling a heat generating spot in a liquid crystal image display according to a second exemplary embodiment of the present invention.
Figure 15:
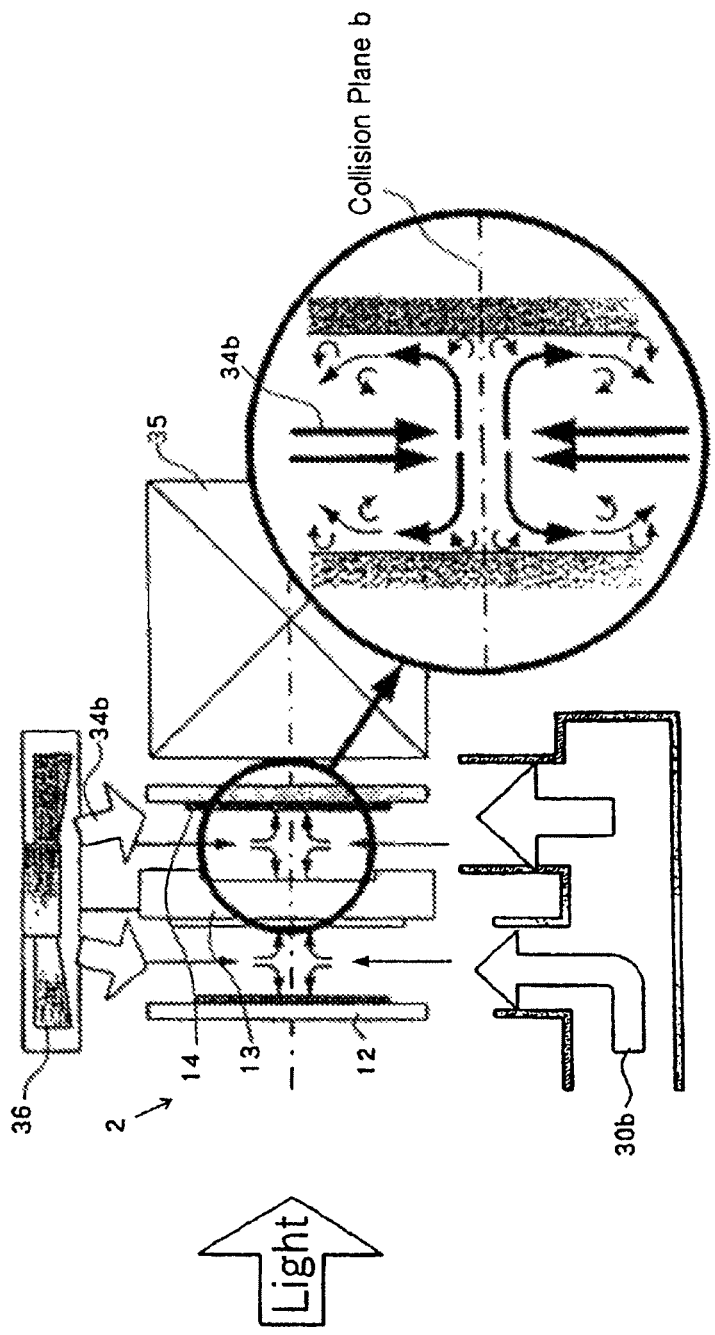
FIG. 15 illustrates a schematic partial cross-sectional view and a partially enlarged cross-sectional view showing the flow of an air stream for cooling a liquid crystal unit in FIG. 14.

Next, a second exemplary embodiment in an apparatus for cooling an electronic device according to the present invention will be described in detail with reference to the drawings. FIG. 14 is a schematic cross-sectional view for describing the configuration and operation of the apparatus for cooling a heat generating spot in a liquid crystal image display according to the second exemplary embodiment of the present invention, and FIG. 15 includes a schematic partial cross-sectional view and a partially enlarged cross-sectional view showing the flow of air for cooling a liquid crystal unit in FIG. 14.

In cooling apparatus 26b in the second exemplary embodiment, and in cooling apparatus 26a in the first exemplary embodiment, second air cooling unit 33b disposed at the upper end of liquid crystal unit 2 includes axial fan 36 alone.

Also, in this event, first air flow (stream) 30b sent by first air cooling unit 29b including first cooling fan 27b and first air cooling duct 28b, and second air stream 34b sent from second air cooling unit 33b including axial fan 36 are fed into the space between incident-side polarizing plate 12 and liquid crystal panel 13, which form part of liquid crystal unit 2, and the space between liquid crystal panel 13 and exit-side polarizing plate 14. Hence, the first air flow 30b and the second air stream 34b collide at substantially the central position between the respective elements (collision plane b in FIG. 15) in an opposing state. Thus, a perpendicular jet stream is generated which goes toward incident/exit-side polarizing plates 12, 14 and the light transmission plane of liquid crystal panel 13, which are heat generating planes, in a manner similar to the first exemplary embodiment described above.

In this exemplary embodiment, the second air cooling unit includes the axial fan alone, thereby reducing the size and simplifying the mounting.

Next, third to sixth exemplary embodiments in the apparatus for cooling an electronic device according to the present invention will be described with reference to the drawings.

Figure 16A:
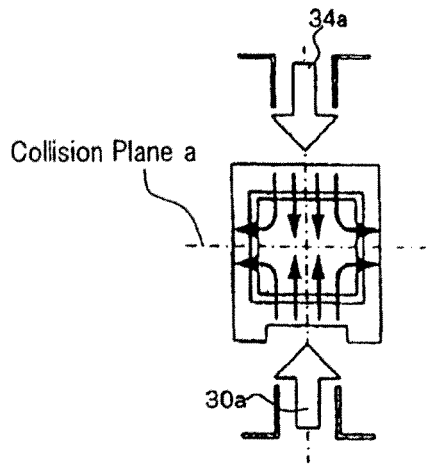
FIG. 16A illustrates a schematic cross-sectional view of a cooling structure in the first exemplary embodiment, as viewed from a light transmission plane side.
Figure 16B:
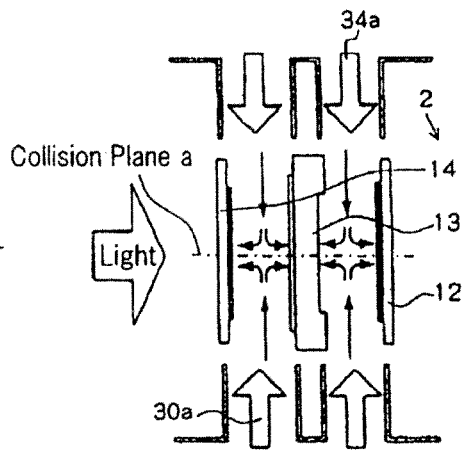
FIG. 16B illustrates a schematic cross-sectional view of the cooling structure in the first exemplary embodiment, as viewed from a transverse plane side.
Figure 16C:
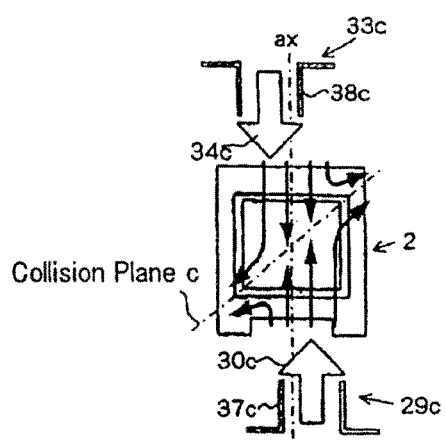
FIG. 16C illustrates a schematic cross-sectional view of a cooling structure in a third exemplary embodiment, as viewed from a light transmission plane side.
Figure 16D:
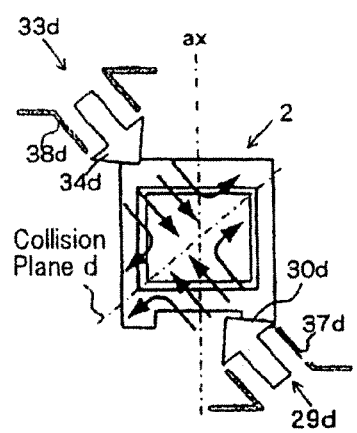
FIG. 16D illustrates a schematic cross-sectional view of a cooling structure in a fourth exemplary embodiment, as viewed from a light transmission plane side.
Figure 16E:
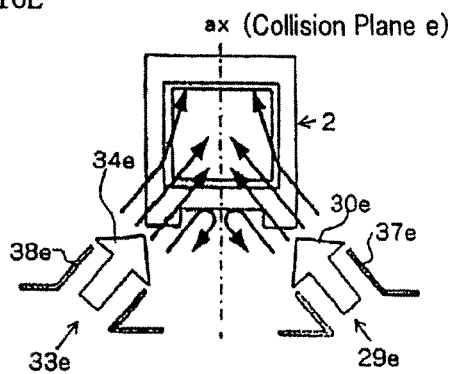
FIG. 16E illustrates a schematic cross-sectional view of a cooling structure in a fifth exemplary embodiment, as viewed from a light transmission plane side.
Figure 16F:
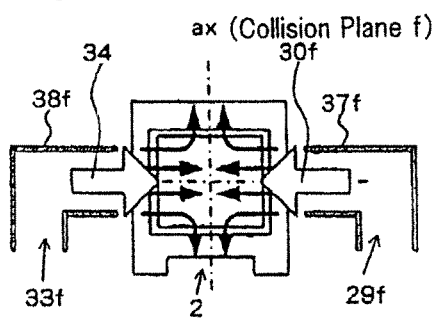
FIG. 16F illustrates a schematic cross-sectional view of a cooling structure in a sixth exemplary embodiment, as viewed from a light transmission plane side.

FIGS. 16A to 16F are schematic cross-sectional views of cooling structures in the first and third to sixth exemplary embodiments, where FIG. 16A is a schematic cross-sectional view of the first exemplary embodiment as viewed from a light transmission plane side; FIG. 16B is a schematic cross-sectional view of the first exemplary embodiment as viewed from a transverse plane side; FIG. 16C is a schematic cross-sectional view of a third exemplary embodiment as viewed from the light transmission plane side; FIG. 16D is a schematic cross-sectional view of a fourth exemplary embodiment as viewed from the light transmission plane side; FIG. 16E is a schematic cross-sectional view of a fifth exemplary embodiment as viewed from the light transmission plane side; and FIG. 16F is a schematic cross-sectional view of a sixth exemplary embodiment as viewed from the light transmission plane side. FIGS. 16A and 16B are provided for describing a comparison of the first exemplary embodiment with the third to sixth exemplary embodiments.

In the first exemplary embodiment, air streams are fed by independent air cooling units 29a, 33a from the upward and downward directions of liquid crystal unit 2 in opposing directions to cause cooling air streams to collide with each other at the central position on the light transmission plane (collision plane a) of liquid crystal unit 2, thereby generating a perpendicular flow (collision jet stream) toward each heat generating plane.

On the other hand, in the cooling structure in the third exemplary embodiment illustrated in FIG. 16C, first discharge port 37c of first air cooling unit 29c disposed at the lower end of liquid crystal unit 2, and second discharge port 38c of second air cooling unit 33c disposed at the upper end of liquid crystal unit 2 in the same manner are offset to left and right, respectively, from the central axial line of the panel indicated by ax in the figure.

In this way, first air stream 30c by first air cooling unit 29c and like second air stream 34c by second air cooling unit 33c oppositely collide at a position corresponding to a shift of an air velocity distribution, to form evolutional flows which go perpendicularly to the heat generating planes at positions substantially along a diagonal (collision plane c in the figure) on the light transmission plane. Consequently, it is possible to accomplish wide and highly efficient cooling of the liquid crystal unit.

In this event, since the air streams flow in an oblique direction after the collision, heated exhaust air can be readily discharged outside of the housing such that the exhaust air will not circulate again into the cooling air.

The cooling structure in the fourth exemplary embodiment illustrated in FIG. 16D includes first discharge port 37d of first air cooling unit 29d and like second discharge port 38d of second air cooling unit 33d being disposed so as to oppose substantially on a diagonal of the light transmission plane.

In this way, like the third exemplary embodiment described above, first air stream 30d by first air cooling unit 29d and like second air stream 34d by second air cooling unit 33d are fed into the space between the incident-side polarizing plate and liquid crystal panel, and the space between the liquid crystal panel and exit-side polarizing plate, and collide in opposition to each other at a diagonal position (collision plane d in the figure) on the light transmission plane. Thus, evolutional flows are formed which go perpendicularly to the heat generating planes on the diagonal of the light transmission planes to produce similar effects to those of the third exemplary embodiment.

The cooling structure in the fifth exemplary embodiment illustrated in FIG. 16E includes in that both first cooling unit 29e and second cooling unit 33e being disposed on both sides of the Lower end of the liquid crystal unit. First discharge port 37e of first air cooling unit 29e and like second discharge port 38e of second air cooling unit 33e are set such that air feeding directions intersect on the center line (ax in the figure) of the panel in the vertical direction.

In this event, like other exemplary embodiments, the liquid crystal unit can be highly efficiently cooled, and simultaneously, the first and second air streams can be discharged in the same direction toward above the liquid crystal unit, thus facilitating the heat exhaustion processing.

The cooling structure in the sixth exemplary embodiment illustrated in FIG. 16F includes first discharge port 37f of first air cooling unit 29f and like second discharge port 38f of second air cooling unit 33f being disposed so as to oppose each other on the left and right sides of liquid crystal unit 2.

In this event, mounting spaces must be provided on the left and right sides of the liquid crystal units. However, since evolutional flows toward the heat generating planes are formed on the center axis (ax in the figure) of the panel, this is effective for a liquid crystal panel which exhibits a large temperature gradient in the vertical direction.

Next, a seventh exemplary embodiment in the cooling apparatus of the present invention will be described with reference to the drawings.

Figure 17A:
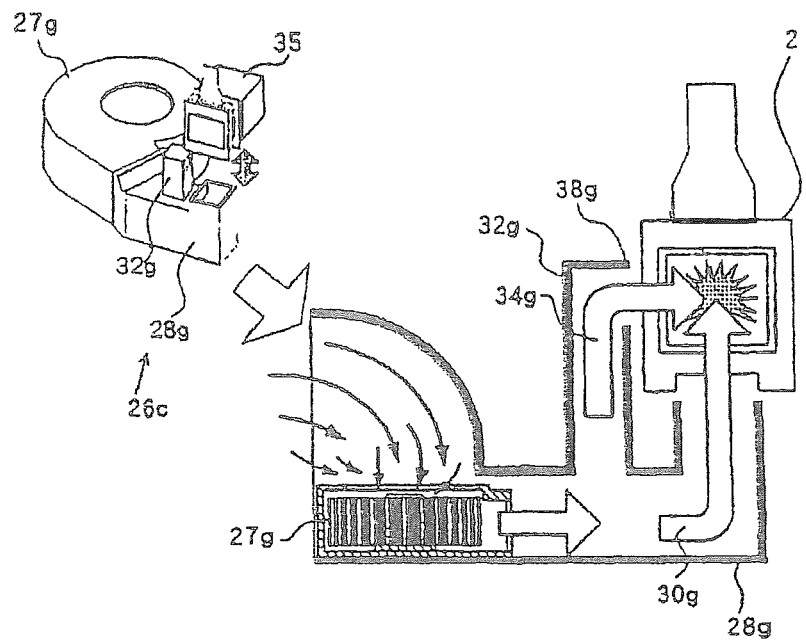
FIG. 17A illustrates a schematic explanatory diagrams of a seventh exemplary embodiment according to the present invention, including a perspective view which describes a duct configuration of a cooling apparatus, and a cross-sectional view which describes operations.
Figure 17B:
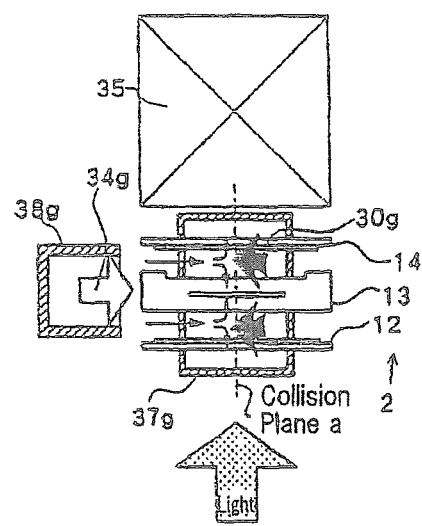
FIG. 17B illustrates a schematic explanatory diagram of the seventh exemplary embodiment according to the present invention, and a top plan view which describes the operation of the cooling apparatus.

FIGS. 17A and 17B are schematic explanatory diagrams of the seventh exemplary embodiment according to the present invention, where FIG. 17A includes a perspective view which describes a duct configuration of the cooling apparatus, and a cross-sectional view which describes the operation, while FIG. 17B is a top plan view which describes the operation in the same manner.

In the seventh exemplary embodiment illustrated in FIGS. 17A and 17B, the second cooling fan which forms part of the second air cooling unit is omitted. However, first cooling fan 27g is shared, and second air cooling duct 32g is branched halfway from first air cooling duct 28g, and extended toward the center of liquid crystal unit 2 at a lateral position of liquid crystal unit 2 to discharge second air stream 34g toward the center of the light transmission plane substantially horizontally from a lateral direction of liquid crystal unit 2, in the cooling apparatus of the first to sixth exemplary embodiments described above.

In this way, first air stream 30g fed by first duct 28g from below to above liquid crystal unit 2, and second air stream 34g fed from one side of liquid crystal unit 2 have two different vectors (orthogonal vectors in this exemplary embodiment) and collide in a space in the unit near the central position on the light transmission plane between incident-side polarizing plate 12 and liquid crystal panel 13 or between liquid crystal panel 13 and exit-side polarizing plate 14. Thus, a high cooling effect can be accomplished in a manner similar to the first to sixth exemplary embodiments described above.

Also, in this event, since first cooling fan 27g is shared by first air cooling duct 28g and second cooling duct 32g, the number of mounted fans can be reduced to lead to a reduction in cost and noise. In addition, since second duct 32g is formed by branching part of first duct 30g, not only the cooling fan but also the cooling apparatus can be reduced in mounting volume, thus facilitating applications to small projector apparatuses.

Further, since either the second cooling fan or the second duct need not be provided as an independent member, an assembling process can be simplified. This additionally allows maintaining the same productivity as the projector apparatus in the configuration of the background related art which employs a single cooling fan, while providing high cooling capabilities.

Next, with reference to the drawings, described is a method of improving the quality of projected image using the cooling apparatus of the present invention by expanding a cooling action area to increase a heat radiation effect and simultaneously mitigating thermal gradient on the surface of the liquid crystal panel.

Figure 18:
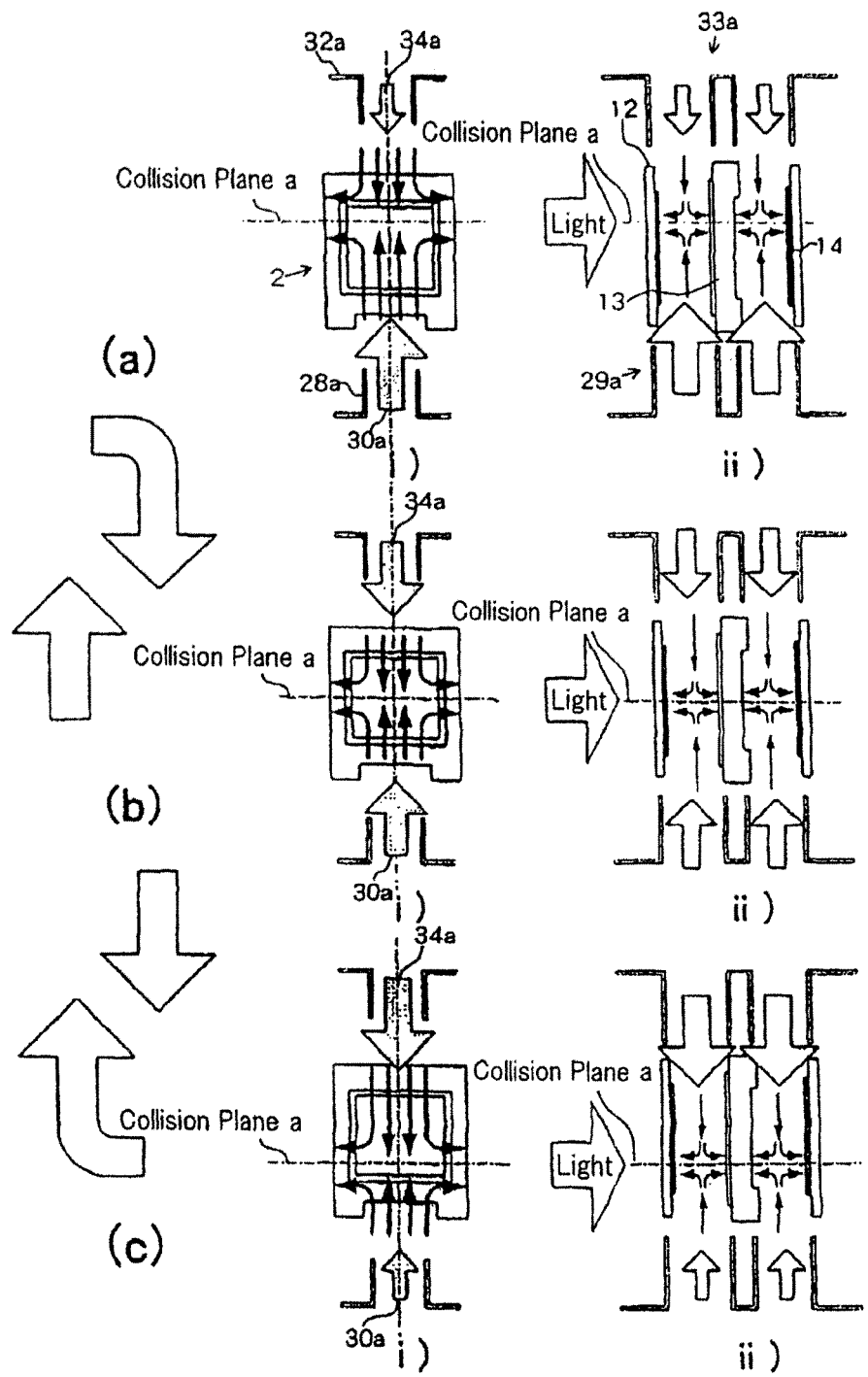
FIG. 18 illustrates a schematic explanatory diagrams showing a control method in a cooling apparatus of the present invention, where (i) illustrates a front view of a liquid crystal unit as viewed from a light transmission plane side, and (ii) illustrates a cross-sectional view of the same, and (a), (b), (c) show changes in the amount of air streams of a fan in time series.

FIG. 18 includes schematic explanatory diagrams showing a control method in the cooling apparatus of the present invention, where (i) is a front view of a liquid crystal unit as viewed from the light transmission plane side, and (ii) illustrates a cross-sectional view of the same, and (a), (b), (c) indicate changes in time-series fan air amount. The order (a)→(b)→(c)→(b)→(a) represents fan air amount control in time-series and a ventilation state at the respective instances.

In the explanatory diagrams, the cooling apparatus of the first exemplary embodiment described above is given as an example, but it can be applied to cooling apparatuses of other exemplary embodiments.

First air cooling unit 29a and second air cooling unit 33a provided at the lower end and upper end of liquid crystal unit 2, respectively, include a first cooling fan (not shown) and first air cooling duct 28a, and a second cooling fan (not shown) and second air cooling duct 32a, respectively. From respective duct discharge ports, first air stream 30a and second air stream 34a are fed in opposite directions into spaces between incident-side polarizing plate 12 and liquid crystal panel 13 and between liquid crystal panel 13 and exit-side polarizing plate 14. Streams 30a, 30b collide at midway positions therein to form evolutional flows in a direction perpendicular to the light transmission planes. Thus, the heat generating planes are cooled with perpendicular jet streams.

This cooling method controls the ratio of the amount of air fed by the first cooling fan to the amount of air fed by the second cooling fan to vary the location of the collision over time, and move the perpendicular flows to the light transmission planes in the vertical direction, thereby expanding an area to which the highly efficient cooling acts, and simultaneously mitigating the difference in temperature on the panel surface.

Specifically, the independent cooling fans (first cooling fan and second cooling fan) are controlled to adjust the ratio of the respective amounts of air fed by the fans such that a first air amount is larger than a second air amount at a certain time (FIG. 18(a)); such that the first air amount is equal to the second air amount at the next time (FIG. 18(b)); and such that the first air amount is smaller than the second air amount at the next time (FIG. 18(c)). The air amount control may electrically vary the rotational speeds of the fans, or may be conducted by adjusting the openings of dampers provided in the ducts.

The control is periodically repeated such as (a)→(b)→(c)→(b)→(a), thereby vertically moving the evolutional flows (collision jet streams) formed on the input/output polarizing plates and the light transmission plane of the liquid crystal panel to vary the position at which the maximum cooling effect is provided (i.e., the position at which the air streams collide) to expand a region in which the cooling action is high, and mitigate local variations in heat transfer coefficient within the light transmission plane over time, so that the temperature gradient is restrained within the panel surface to improve the quality of projected images.

While the foregoing description has given the first exemplary embodiment as an example, it is obvious that similar effects are also provided by conducting such air amount control in other exemplary embodiments.

In an eighth exemplary embodiment of an apparatus for cooling a heat generating spot of an electronic device of the present invention, a first air stream from first air cooling means and a second air stream from a second air cooling means have different air velocity vectors from each other. The first air cooling means and second air cooling means may be set such that the first air stream and second air stream collide with each other at the positions of heat generating spots on opposing surfaces of a plurality of components. The first air cooling means may be disposed at the lower end of the opposing planes of the plurality of components, while the second air cooling means may be disposed at the upper end of the opposing planes of the plurality of components. The first air cooling means may include a first cooling fan and a first air cooling duct, while the second air cooling means may include a second air cooling fan and a second air cooling duct. One of the first air cooling means and second air cooling means may include a cooling fan and an air cooling duct, while the other may include a cooling fan alone. The first air cooling means may include a first cooling fan and a first air cooling duct, while the second air cooling means may include the first cooling fan shared by the first air cooling means, and a second air cooling duct branched halfway from the first air cooling duct for feeding air into the plane from a direction different from an air feeding direction of the first air cooling duct. Also, the first cooling fan and second cooling fan may provide variable amounts of air.

The effect of the present invention can also be produced in the cooling of heat generating spots in a plurality of components of an electronic device which have surfaces opposite to each other, at least any of which includes the heat generating spot.

Also, since the position at which fan air streams collide can be arbitrarily set by arbitrarily controlling the ratio of air amounts from a pair of air cooling means, the position at which the collision jet streams are produced can be periodically varied on the basis of the center of the panel to mitigate thermal gradient on the panel surface, thus advantageously improving the image quality.

In a ninth exemplary embodiment of the apparatus for cooling a heat generating spot of an electronic device according to the present invention, the electronic device may be a liquid crystal image display, and components may include an incident-side polarizing plate, a liquid crystal panel, and an exit-side polarizing plate which form part of the liquid crystal unit.

In a tenth exemplary embodiment of the present invention, a method of cooling a heat generating spot of an electronic device may be a heat generating spot cooling method for the aforementioned apparatus for cooling a heat generating spot of an electronic device. The tenth embodiment may include feeding a first air stream by first air cooling means for components of the electronic device in a first direction in gaps between opposing surfaces of the components. Additionally, a second air stream is fed by second air cooling means in a second direction different from the first direction in gaps between the opposing surfaces of the components to cause the first air stream and second air stream to collide with each other near the central positions of heat generating spots on the opposing surfaces of the component. Thus, evolutional flows are generated which go perpendicularly to one or both of the opposing surfaces of the components.

In a method of cooling a heat generating spot of an electronic device according to an eleventh exemplary embodiment of the present invention, first air cooling means is disposed at a lower end of components of an electronic device, and second air cooling means is disposed at an upper end of the components of the electronic device. A first air stream by the first air cooling means may be fed from below to above in spaces between a plurality of components, while a second air stream by the second air cooling means may be fed cooling below in the spaces between the plurality of components, to cause the first air stream and second air stream to collide with each other near the central positions of heat generating spots on opposing surfaces of the components. Thus, evolutional flows are generated which go perpendicularly to one or both of the opposing surfaces of the components. By varying, over time, the ratio of air amounts of the first cooling fan which forms part of the first air cooling means to a second cooling fan which forms part of the second air cooling means, the position at which the first air stream and second air stream collide may be periodically moved from the central positions of the heat generating spots on the opposing surfaces of the components. The electronic device may be a liquid crystal image display, and the components may include an incident-side polarizing plate, a liquid crystal panel, and an exit-side polarizing plate which include a liquid crystal unit.

In a twelfth exemplary embodiment of the present invention, a liquid crystal projector apparatus includes any of the aforementioned apparatus for cooling a heat generating spot of an electronic device.

In the apparatus for cooling a heat generating spot of an electronic device according to the present invention, when the electronic device is, for example, a liquid crystal image display of a liquid crystal projector apparatus, a pair of independent air cooling means, each, including a cooling fan and an air cooling duct, are provided above and below a liquid crystal unit. Thus, air streams are fed across the liquid crystal unit therebetween from above and below in opposite directions to pass the air streams through spaces between the incident-side polarizing plate and liquid crystal panel or between the liquid crystal panel and exit-side polarizing plate. The two air streams to collide near the center of a light transmission plane near the central position of a heat generating spot to improve the cooling efficiency.

Figure 19:
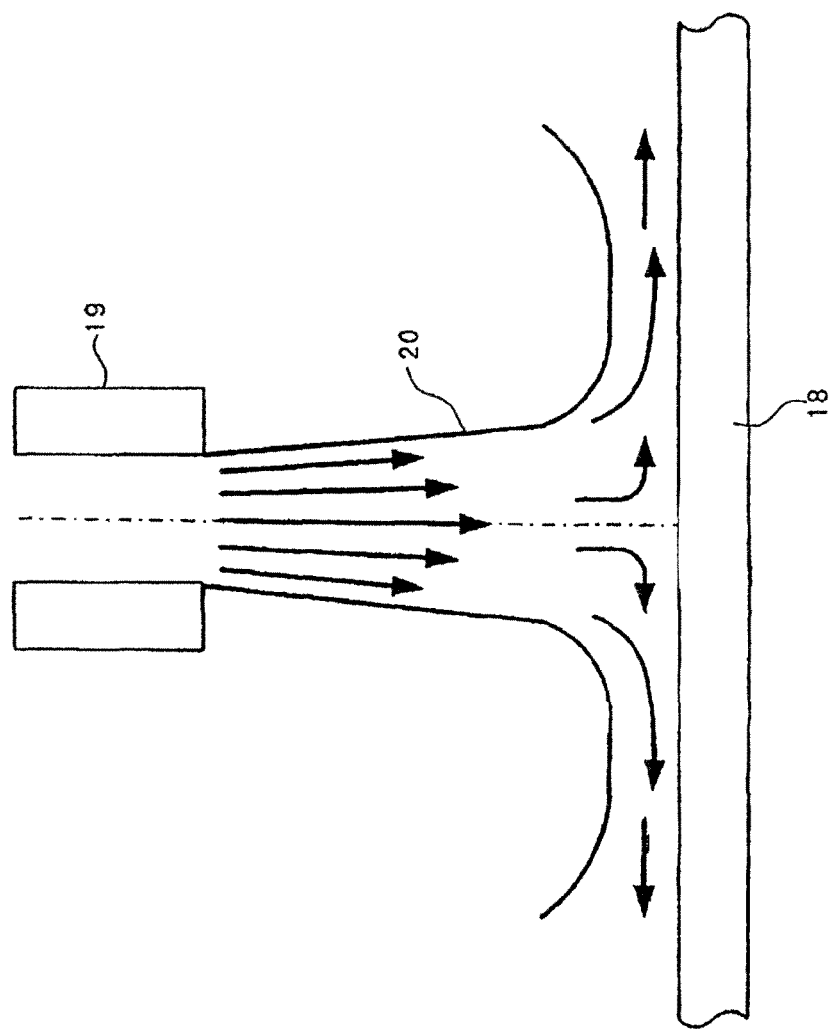
FIG. 19 illustrates a schematic diagram for describing impinging jet cooling.

For cooling a heat generating flat plate such as a polarizing plate and a liquid crystal panel by forced air cooling, collision jets cooling may be given as one of the methods which provides the highest cooling efficiency. FIG. 19 is a schematic diagram for describing the collision jet cooling. As illustrated in FIG. 19, the collision jet cooling is a method which involves jetting coolant (air, liquid) 20 perpendicularly to heat generating flat plate 18 through nozzle 19 to cause an impinging jet flow to collide with heat generating plate 18, thereby radiating heat from a heat generating plane.

Generally, in the forced air cooling for a heat generating flat plate, two approaches, i.e., a thinning method and a replacement method are contemplated for improving the heat transfer coefficient to promote the heat transfer.

The former is a method which promotes the heat transfer by reducing the thickness (thinning) of a thermal boundary layer formed on the surface of a heat generating body, in which case since the thickness of the thermal boundary layer is reciprocally proportional to the square root of a the velocity in a main stream direction (flow rate along the flat plate), the aforementioned manner of increasing the air velocity to reduce the temperature of the heat generating body is comparable to this.

The latter intends to promote the heat transfer by encouraging the exchange of a fluid near the surface of a solid with a fluid slightly spaced apart therefrom, and is achieved by controlling a turbulent flow which is associated with generation/disappearance of a unsteady vortex.

The collision jet cooling for cooling a heat generating flat plate by causing a jet stream to collide with the heat generating flat plate from a direction perpendicular thereto falls under the latter. The collision jet cooling demonstrates cooling capabilities higher by a factor of five to ten than a conventional method of feeding air along a heat generating flat plate through a process of:

1) breakage (peeling) of the thermal boundary layer on the surface of the heat generating body due to the collision jet stream;

2) exchange of fluids (temperature replacement) due to the evolutional flow produced on the collision plane; and 3) sliding of the jet stream on the wall due to the Coanda effect (the nature of a fluid by which an object placed in a flow causes a reduction in pressure between a fluid and a wall surface of a solid to attract the flow to the wall surface, thereby changing the direction of the flow along the object).

Incidentally, when such collision jet cooling is applied, for example, to cooling of a liquid crystal image display in a liquid crystal projector apparatus, a nozzle position thereof is a problem to be solved. Specifically, since a liquid crystal panel and a polarizing plate generate heat due to a light absorption effect when each color light passes, the heat generating plane substantially matches with the light transmission plane (panel light transmission plane 22, polarizing plate light transmission plane 25), as illustrated in FIGS. 20A and 20B. Accordingly, it is necessary to generate a perpendicular air flow to the heat generating plane so as not to impede the transmission of each color. FIGS. 20A and 20B are schematic diagrams for describing the light transmission planes of the liquid crystal panel and polarizing plate in a liquid crystal image display, where FIG. 20A is a front view which depicts a liquid crystal panel and a polarizing plate placed side by side, and FIG. 20B is a side view.

Thus, in the cooling mechanism for a liquid crystal image display in the present invention, cooling air streams are fed from above and below the liquid crystal unit in directions opposite to each other to cause the cooling air streams to collide with each other near the center of the light transmission plane in a space between the liquid crystal panel and polarizing plate. Thus, evolution flows are generated which go perpendicularly to heat generating planes of both the liquid crystal panel and polarizing plate to form vertical jet streams, thereby dramatically increasing the heat transfer coefficient to promote the heat transfer and accomplish highly efficient cooling of the liquid crystal unit.

Further, by changing the ratio of air amounts by the fans provided above and below the liquid crystal unit over time, the position at which the air streams collide (position at which the vertical jet streams are generated) can be vertically vibrated from the center of the liquid crystal panel with respect to the liquid crystal panel and polarizing plate. In this way, since a region at which the maximum cooling effect is demonstrated (position of collision) can be periodically varied within the panel surface, it is possible to eliminate thermal gradient on the surface of the liquid crystal panel to improve the quality of projected images.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

Further, it is noted that Applicant's intent is to encompass equivalents of all claim elements, even if amended later during prosecution.

This application is based upon and claims the benefit of priority from Japanese patent application No. 2006-287395, filed on Oct. 23, 2006, the disclosure of which is incorporated herein in its entirety by reference.

The invention claimed is:

1. A cooling apparatus for a liquid crystal image display that includes a liquid crystal unit comprising an incident-side polarizing plate, a liquid crystal panel, and an exit-side polarizing plate,
wherein said incident-side polarizing plate, said liquid crystal panel, and said exit-side polarizing plate are disposed side by side with a gap therebetween to have a same in-plane direction,
said cooling apparatus comprising:
a first air cooling unit for feeding a first air stream in an orientation of said in-plane direction; and
a second air cooling unit for feeding a second air stream in said in-plane direction in a different orientation from said first air stream by said first air cooling unit,
wherein said first air cooling unit and said second air cooling unit are set such that said first air stream and said second air stream collide with each other between said incident-side polarizing plate and said liquid crystal panel and/or between said liquid crystal panel and said exit-side polarizing plate such that an impinging jet flows perpendicular to at least the liquid crystal panel is generated,
wherein the first air cooling unit includes a first discharge port, and the second air cooling unit includes a second discharge port, wherein the first discharge port and the second discharge port are placed across each other with respect to the liquid crystal unit, and wherein the first discharge port and the second discharge port are placed offsetting each other from a central line of the liquid crystal unit.

2. The cooling apparatus for a liquid crystal image display according to claim 1, further comprising:
a cooling fan that is shared between said first air cooling unit and said second air cooling unit;
a first air cooling duct provided in said first air cooling unit; and
a second air cooling duct provided in said second air cooling unit.

3. The cooling apparatus for a liquid crystal image display according to claim 1, wherein said first air cooling unit comprises a first cooling fan and a first air cooling duct, and
wherein said second air cooling unit comprises a second cooling fan and a second air cooling duct.

4. The cooling apparatus for a liquid crystal image display according to claim 1, wherein one of said first air cooling unit and said second air cooling unit comprises a cooling fan and an air cooling duct, and another one of said first air cooling unit and said second air cooling unit comprises a cooling fan alone.

5. The cooling apparatus for a liquid crystal image display according to claim 1, wherein said first air cooling unit comprises a first cooling fan and a first air cooling duct, and
wherein said second air cooling unit comprises said first cooling fan shared between said first air cooling unit and said second air cooling unit, and a second air cooling duct branched halfway from said first air cooling duct for feeding air in said in-plane direction from a direction different from an air feeding direction of said first air cooling duct.

6. The cooling apparatus for a liquid crystal image display according to claim 3, wherein said first cooling fan and said second cooling fan feed variable amounts of air.

7. A crystal projector apparatus comprising a cooling apparatus for a liquid crystal image display according to claim 1.

8. The cooling apparatus for a liquid crystal image display according to claim 1, wherein said first air stream and said second air stream collide with each other between said incident-side polarizing plate and said liquid crystal panel and between said liquid crystal panel and said exit-side polarizing plate.

9. The cooling apparatus for a liquid crystal image display according to claim 1, wherein said first air stream is sent from a lower end of said liquid crystal unit into a space between said incident-side polarizing plate and said liquid crystal panel and a space between said liquid crystal panel and said exit-side polarizing plate in an upward direction, and
wherein said second air stream is sent from an upper end of said liquid crystal unit into the space between said incident-side polarizing plate and said liquid crystal panel and the space between said liquid crystal panel and said exit-side polarizing plate in a downward direction.

10. A cooling apparatus for a liquid crystal image display that includes a liquid crystal unit comprising an incident-side polarizing plate, a liquid crystal panel, and an exit-side polarizing plate,
wherein said incident-side polarizing plate, said liquid crystal panel, and said exit-side polarizing plate are disposed side by side with a gap therebetween to have a same in-plane direction,
said cooling apparatus comprising:
a first air cooling unit for feeding a first air stream in an orientation of said in-plane direction; and
a second air cooling unit for feeding a second air stream in said in-plane direction in a different orientation from said first air stream by said first air cooling unit,
wherein said first air cooling unit and said second air cooling unit are set such that said first air stream and said second air stream collide with each other between said incident-side polarizing plate and said liquid crystal panel and/or between said liquid crystal panel and said exit-side polarizing plate such that an impinging jet flows perpendicular to at least the liquid crystal panel is generated,
wherein said first air cooling unit feeds said first air stream in an opposite direction than a direction that said second air cooling unit feeds said second air stream, and
wherein a first discharge port of the first air cooling unit and a second discharge port of the second air cooling unit are placed offsetting each other from a central line of the liquid crystal unit.

11. The cooling apparatus for a liquid crystal image display according to claim 10, wherein the impinging jet flows perpendicular to said incident-side polarizing plate.

12. The cooling apparatus for a liquid crystal image display according to claim 11, wherein the impinging jet flows perpendicular to said exit-side polarizing plate.

13. The cooling apparatus for a liquid crystal image display according to claim 10, wherein the impinging jet flows perpendicular to said exit-side polarizing plate.

14. The cooling apparatus for a liquid crystal image display according to claim 10,
wherein the first discharge port and the second discharge port are placed across each other with respect to the liquid crystal unit.

* * * * *